US009910127B2

(12) United States Patent
Hines et al.

(10) Patent No.: US 9,910,127 B2
(45) Date of Patent: Mar. 6, 2018

(54) APPARATUS AND METHOD FOR POINTING LIGHT SOURCES

(75) Inventors: Braden E. Hines, Pasadena, CA (US); Richard L. Johnson, Suffolk, VA (US)

(73) Assignee: SOLARRESERVE TECHNOLOGY, LLC, Santa Monica, CA (US)

( * ) Notice: Subject to any disclaimer, the term of this patent is extended or adjusted under 35 U.S.C. 154(b) by 673 days.

(21) Appl. No.: 14/004,982

(22) PCT Filed: Mar. 14, 2012

(86) PCT No.: PCT/US2012/029110
§ 371 (c)(1),
(2), (4) Date: Jan. 2, 2014

(87) PCT Pub. No.: WO2012/125751
PCT Pub. Date: Sep. 20, 2012

(65) Prior Publication Data
US 2014/0110560 A1    Apr. 24, 2014

Related U.S. Application Data

(60) Provisional application No. 61/465,171, filed on Mar. 14, 2011, provisional application No. 61/465,165, (Continued)

(51) Int. Cl.
*F24J 2/38* (2014.01)
*G01S 3/786* (2006.01)
(Continued)

(52) U.S. Cl.
CPC .............. *G01S 3/7861* (2013.01); *F24J 2/06* (2013.01); *F24J 2/07* (2013.01); *F24J 2/38* (2013.01);
(Continued)

(58) Field of Classification Search
CPC ....................................... F24J 2/38; F24J 2/40
(Continued)

(56) References Cited

U.S. PATENT DOCUMENTS

| 4,349,733 A | 9/1982 | Beam et al. |
| 4,519,382 A | 5/1985 | Gerwn |

(Continued)

FOREIGN PATENT DOCUMENTS

| CN | 1515917 | 7/2004 |
| CN | 101918769 A | 12/2010 |

(Continued)

OTHER PUBLICATIONS

European Patent Application No. 13741310.0; Extended Search Report issued Oct. 26, 2015.
(Continued)

*Primary Examiner* — Kevin Pyo
(74) *Attorney, Agent, or Firm* — Kagan Binder, PLLC

(57) ABSTRACT

The present invention relates to apparatus and methods to provide a control system for the purpose of redirecting light from a source onto a target. The present invention appreciates that the diffraction pattern for light that is both diffracted and re-directed by a heliostat is a function of how the light redirecting element is aimed. This means that the aim of the light redirecting element can be precisely determined once the aim of the diffracted light is known. Advantageously, the characteristics of diffracted light indicative of how the diffracted light is aimed can be determined from locations outside the zone of concentrated illumination in which sensors are at undue risk. This, in turn, means that diffracted light characteristics can be detected at a safe location, and this information can then be used to help precisely aim the light redirecting element onto the desired target, such as a receiver in a CSP system. The aim of the diffracted light is
(Continued)

thus an accurate proxy for the light beam to be aimed at the receiver.

17 Claims, 22 Drawing Sheets

Related U.S. Application Data filed on Mar. 14, 2011, provisional application No. 61/465,216, filed on Mar. 16, 2011.

(51) Int. Cl.
| | | |
|---|---|---|
| *F24J 2/07* | (2006.01) | |
| *F24J 2/54* | (2006.01) | |
| *F24J 2/06* | (2006.01) | |
| *G02B 19/00* | (2006.01) | |
| *F24J 2/08* | (2006.01) | |
| *F24J 2/10* | (2006.01) | |

(52) U.S. Cl.
CPC ........ *F24J 2/5424* (2013.01); *G02B 19/0042* (2013.01); *F24J 2/08* (2013.01); *F24J 2002/1076* (2013.01); *F24J 2002/5489* (2013.01); *Y02E 10/41* (2013.01); *Y02E 10/44* (2013.01); *Y02E 10/47* (2013.01)

(58) Field of Classification Search
USPC .......... 250/203.1, 203.4; 126/573, 574, 600, 126/601
See application file for complete search history.

(56) References Cited

U.S. PATENT DOCUMENTS

| | | | |
|---|---|---|---|
| 4,874,937 A | 10/1989 | Okamoto | |
| 4,998,823 A | 3/1991 | Kitajima | |
| 5,282,016 A | 1/1994 | Shen et al. | |
| 5,670,774 A | 9/1997 | Hill | |
| 5,862,799 A | 1/1999 | Yogev et al. | |
| 6,174,648 B1 | 1/2001 | Terao et al. | |
| 6,923,174 B1 | 8/2005 | Kurz | |
| 9,010,317 B1 * | 4/2015 | Gross .................. | F24J 2/36 |
| | | | 126/573 |
| 9,157,656 B2 | 10/2015 | Saeck et al. | |
| 9,606,340 B2 | 3/2017 | Hines et al. | |
| 2004/0031483 A1 | 2/2004 | Kinoshita | |
| 2005/0274376 A1 | 12/2005 | Litwin et al. | |
| 2006/0098566 A1 | 5/2006 | David et al. | |
| 2006/0163446 A1 | 7/2006 | Guyer et al. | |
| 2006/0201498 A1 | 9/2006 | Olsson et al. | |
| 2006/0260605 A1 | 11/2006 | Connor | |
| 2007/0268585 A1 | 11/2007 | Santoro et al. | |
| 2009/0024987 A1 | 1/2009 | Forster et al. | |
| 2009/0052910 A1 | 2/2009 | Schemmann et al. | |
| 2009/0107485 A1 | 4/2009 | Reznik et al. | |
| 2009/0179139 A1 | 7/2009 | Hines et al. | |
| 2009/0249787 A1 | 10/2009 | Pfahl et al. | |
| 2010/0139644 A1 | 6/2010 | Schwarzbach et al. | |
| 2010/0252024 A1 | 10/2010 | Convery | |
| 2010/0263709 A1 | 10/2010 | Norman et al. | |
| 2011/0000478 A1 | 1/2011 | Reznik | |
| 2011/0120448 A1 | 5/2011 | Fitch et al. | |
| 2011/0155119 A1 | 6/2011 | Hickerson et al. | |
| 2011/0216535 A1 | 9/2011 | McEntee | |
| 2011/0238218 A1 | 9/2011 | Lee et al. | |
| 2011/0265783 A1 * | 11/2011 | Yatir .................. | F24J 2/07 |
| | | | 126/600 |
| 2011/0317876 A1 | 12/2011 | Bender | |
| 2012/0132194 A1 | 5/2012 | Saeck et al. | |
| 2012/0145143 A1 | 6/2012 | Hoffschmidt et al. | |
| 2012/0174909 A1 | 7/2012 | Koningstein et al. | |
| 2015/0160345 A1 | 6/2015 | Hines | |
| 2016/0195302 A1 | 7/2016 | Hines et al. | |

FOREIGN PATENT DOCUMENTS

| | | |
|---|---|---|
| CN | 1353819 | 6/2012 |
| DE | 10 2009 037280 A1 | 4/2011 |
| WO | WO2009/055624 A1 | 4/2009 |
| WO | 2010048589 A2 | 4/2010 |
| WO | WO 2010/101468 | 9/2010 |
| WO | 2011/018367 | 2/2011 |

OTHER PUBLICATIONS

Sargent & Lundy LLC Consulting Group, "Assessment of Parabolic Trough and Power Tower Solar Technology Cost and Performance Forecasts," Oct. 2003, 344 pages.

* cited by examiner

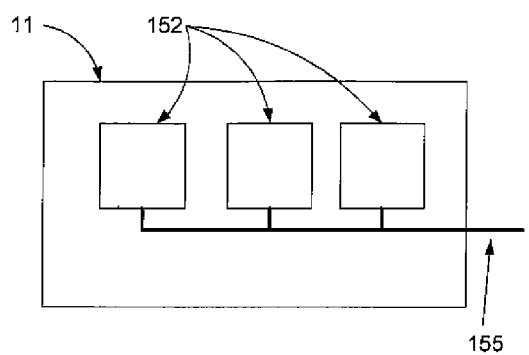
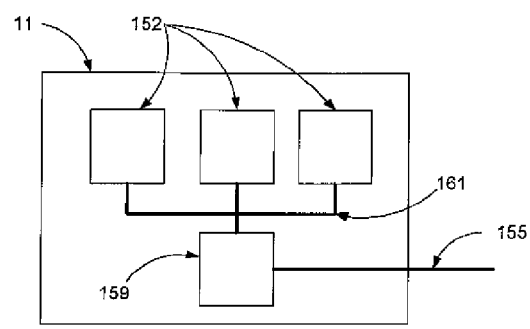
FIGURE 12A
FIGURE 12B

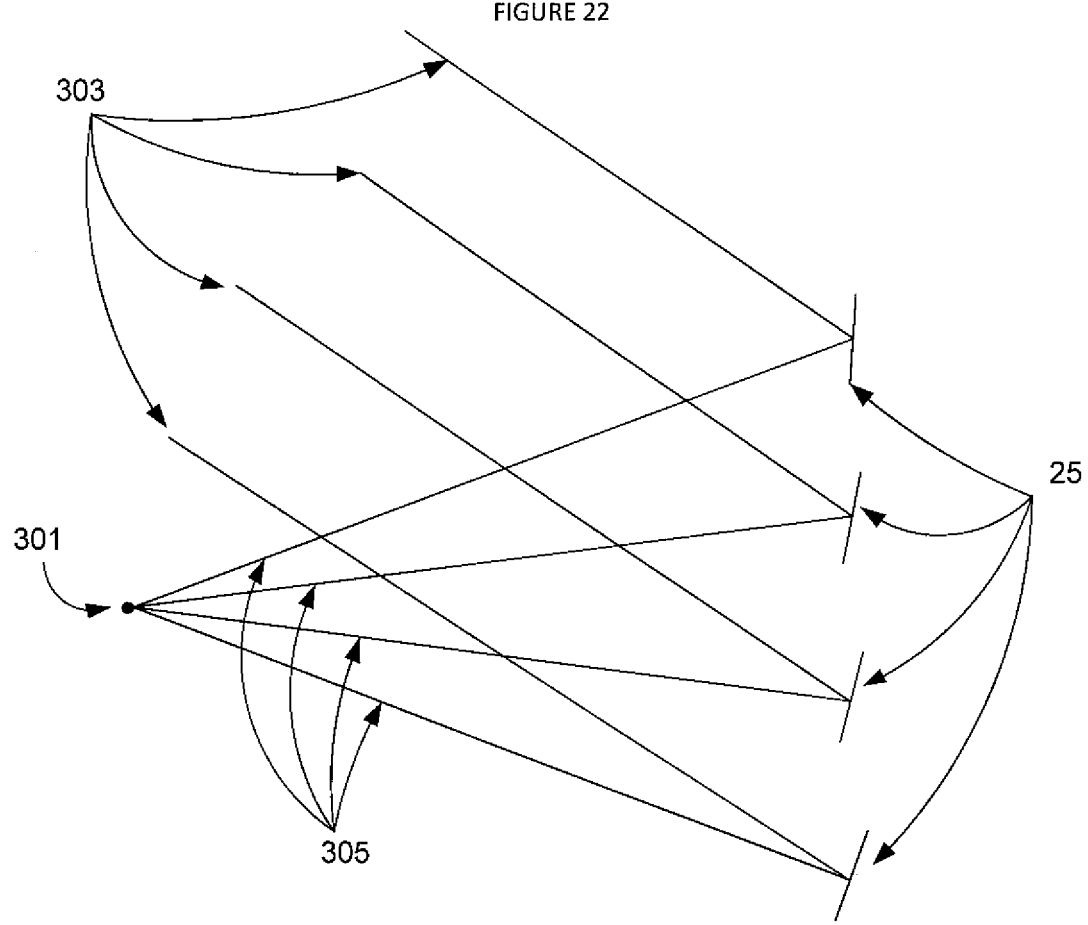

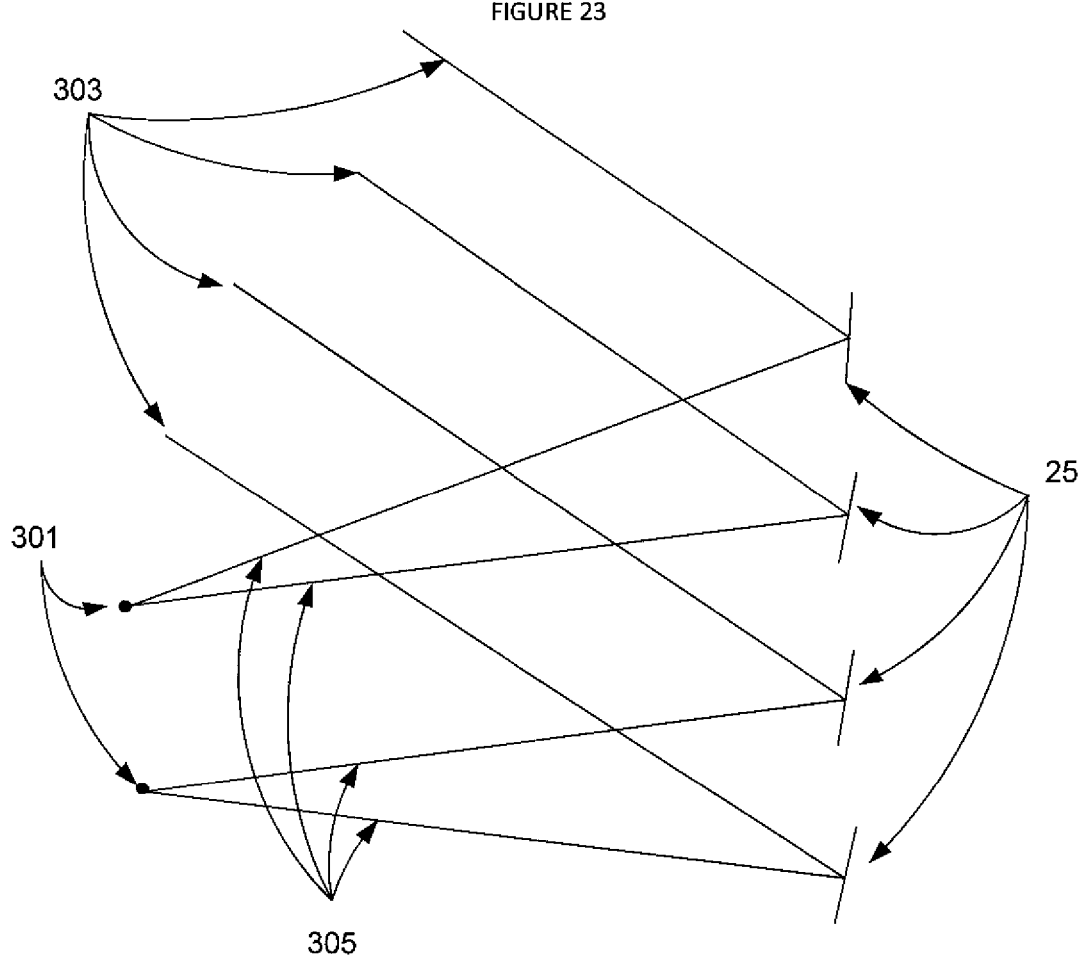

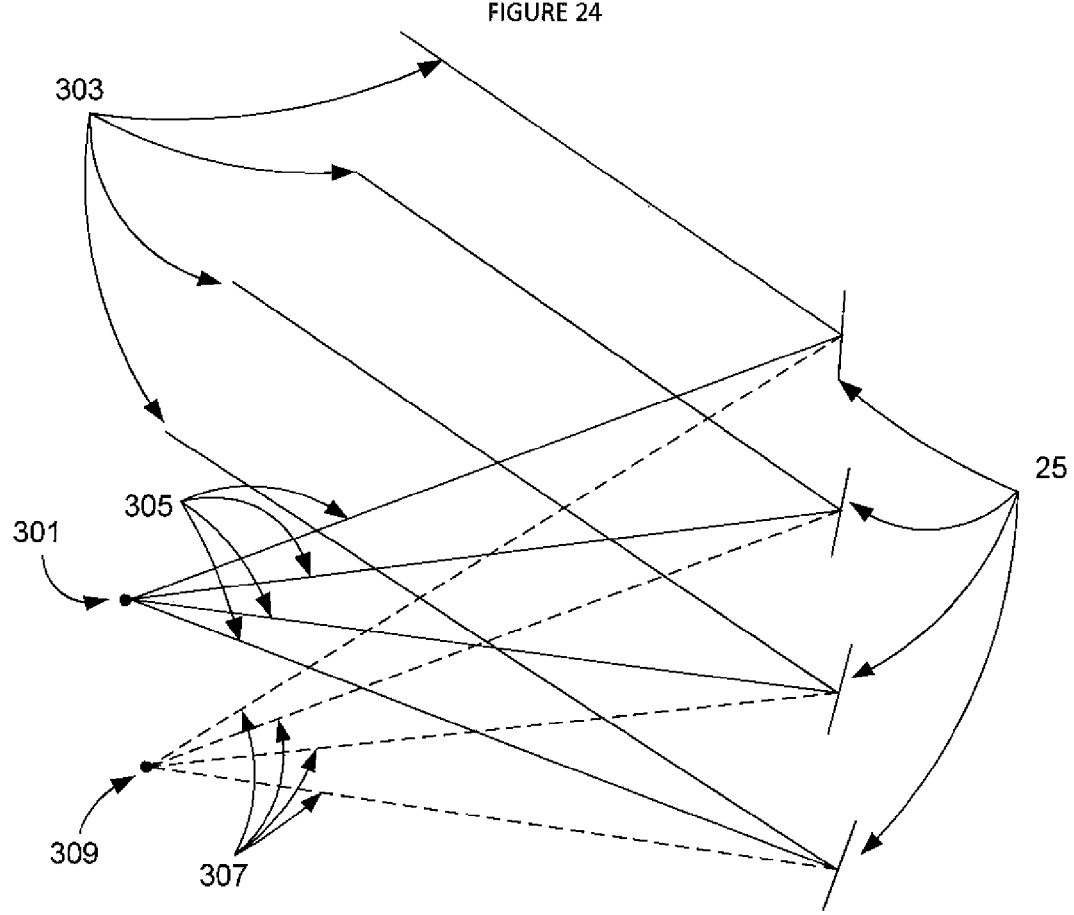

APPARATUS AND METHOD FOR POINTING LIGHT SOURCES

CROSS REFERENCE TO RELATED APPLICATIONS

This application claims the benefit from International No. PCT/US2012/029110, which was granted an International filing date of Mar. 14, 2012, which in turn claims the benefit of U.S. Provisional application No. 61/465,171 filed Mar. 14, 2011, titled ROOFTOP CENTRALIZED CONCENTRATED SOLAR POWER COLLECTION SYSTEM; U.S. Provisional application No. 61/465,165 filed Mar. 14, 2011, titled APPARATUS AND METHOD FOR POINTING LIGHT SOURCES; and U.S. Provisional application No. 61/465,216 filed Mar. 16, 2011, titled TIP-TILT TRACKER, which applications are incorporated herein by reference in their entireties.

FIELD OF THE INVENTION

The present invention relates to control systems that use diffraction information to help aim light redirecting elements at desired target(s). More specifically, these strategies are used to controllably aim heliostats in the field of concentrating solar power (CSP).

BACKGROUND OF THE INVENTION

The use of heliostats in the field of concentrating solar power (CSP) is well established in the prior art. A typical CSP system includes at least one centralized tower and a plurality of heliostats corresponding to each centralized tower. The tower is centralized in the sense that the tower serves as the focal point onto which a corresponding plurality of heliostats collectively redirect and concentrate sunlight onto a target (also referred to as a focus or a receiver) associated with the tower. The concentration of sunlight at the tower receiver is therefore directly related to the number of heliostats associated with the tower up to certain fundamental limits. This approach concentrates solar energy to very high levels, e.g., on the order of 1000× or more if desired. In practical application, many systems concentrate sunlight in a range from 50× to 5000×. The high concentration of solar energy is converted by the tower into other useful forms of energy. One mode of practice converts the concentrated solar energy into heat to be used either directly or indirectly, such as by generating steam, to power electrical generators, industrial equipment, or the like. In other modes of practice, the concentrated solar energy is converted directly into electricity through the use of any number of photovoltaic devices, also referred to as solar cells.

Heliostats generally include a mirror or other suitable optical device to redirect sunlight, support structure to hold the mirror and to allow the mirror to be articulated, and actuators such as motors to effect the articulation. At a minimum, heliostats must provide two degrees of rotational freedom in order to redirect sunlight onto a fixed tower focus point. Heliostat mirrors are may be planar, but could possibly have more complex shapes. Heliostat articulation can follow an azimuth/elevation scheme by which the mirror rotates about an axis perpendicular to the earth's surface for the azimuth and then rotates about an elevation axis that is parallel to the earth's surface. The elevation axis is coupled to the azimuth rotation such that the direction of the elevation is a function of the azimuth angle. Alternatively, heliostats can articulate using a tip/tilt scheme in which the mirror rotates about a fixed tip axis that is parallel to the earth's surface and a further tilt axis. The tip axis often is orthogonal to the tilt axis but its axis of rotation tips as a function of the tip axis rotation. The tilt axis is parallel to the earth's surface when the heliostat mirror normal vector is parallel to the normal vector of the earth's surface.

Heliostats are pointed so that the reflected sunlight impinges on the central tower receiver, which often is fixed in space relative to the heliostat. Because the sun moves relative to the heliostat site during the day, the heliostat reflectors must track the sun appropriately to keep the reflected light aimed at the receiver as the sun moves.

FIG. 1 schematically illustrates a typical CSP system 403. CSP system 403 has tower 405 with focus region 407 and a plurality of corresponding heliostats 409 (only one of which is shown for purposes of illustration) that aim reflected sunlight at region 407. Sunlight represented by vector 411 reflects off the heliostat mirror 413 oriented with surface normal represented by vector 415. Mirror 413 is accurately aimed so that reflected sunlight according to vector 417 is aimed at focus 407 generally along heliostat focus vector 419, which is the line of sight from the heliostat mirror 413 and the tower focus 407. If mirror 413 were to be aimed improperly so that vector 417 is not aimed at focus 407, these two vectors would diverge. Consequently, the reflected light 417 impinges on the tower focus 407. For such conditions to be realized, the laws of reflection require that the angle formed between the sunlight vector 411 and mirror normal 415 must be equal to the angle formed between vector 419 and mirror normal 415. Further, all three vectors 411, 415, and 419 must lie on the same plane. It can be shown using vector algebra that given a sunlight vector 411 and focus vector 419, there is a unique solution for mirror normal 415 that is simply the normalized average of vectors 411 and 419.

Many control strategies use open loop control, closed loop control, or combinations of these. Many heliostat control systems employ open loop algorithms based on system geometry and sun position calculators in order to determine the sun and heliostat-focus vectors as a function of time. These calculations result in azimuth/elevation or tip/tilt commands to each heliostat device. Such control systems generally assume that the location of the heliostats are static and well defined and/or otherwise rely on periodic calibration maintenance to correct for settling and other lifetime induced drifts and offsets. Open loop solutions are advantageous in that they do not require any feedback sensors to detect how well each heliostat is pointed. These systems simply tell every heliostat how to point and assume that the heliostats point correctly. A major drawback is that open loop systems demand components made with high precision if accuracy is to be realized. Incorporating precision into the system components is very expensive. Additionally, it can be cost prohibitive to perform the precise surveying needed to perform open loop calculations with sufficient accuracy. The expense of precision and surveying escalates as the number of heliostats in a heliostat field increases. Consequently, systems that rely only on open loop control tend to be too expensive.

Closed loop heliostat control relies on feedback from one or more sensors capable of measuring differences, or errors, between the desired condition and an actual condition. These errors are then processed into compensation signals to heliostat actuators to articulate the mirrors so that reflected sunlight impinges on the tower focus. Closed loop pointing has an advantage that it does not require precise components or installation or knowledge of the system geometry. The system also can be made less sensitive to lifetime drifts. Less demand for precision means that these systems are much less expensive than systems that rely solely on open loop control. These advantages become more important for smaller scale, commercial rooftop CSP applications. Such installations cannot provide sufficiently stable mounting surfaces because of weight load limitations to maintain accurate open loop control over time without increased maintenance demands. Consequently it is highly desirable that such small scale commercial rooftop installations track the sun using at least some degree of closed loop techniques in order to be cost effective and otherwise practical. Closed loop systems offer the potential to use control software rather than predominantly precision, and control is much less expensive to implement than precision.

A difficulty in applying closed loop pointing methods on CSP systems is that the pointing condition requires the bisection of two vectors rather than alignment to a single vector. This is challenging, because there is no optical signal available at the nominal aim point (i.e., mirror normal 415 in FIG. 1). CSP system designers have contemplated that an ideal location for a feedback sensor would be to place the sensor in the path of the reflected beam, such as at the tower focus 407. Unfortunately, this is not feasible because no practical sensor could withstand the extreme temperatures or the UV dosage that result from highly concentrated sunlight. This poses a significant technical challenge of how to track and correct the aim of a beam if the beam cannot be tracked. Consequently, there remains a strong need for techniques that would allow closed loop pointing to be feasible.

SUMMARY OF THE INVENTION

The present invention relates to apparatus and methods to provide a closed loop pointing system for the purpose of redirecting light from a source onto a target. Whereas the principles of the invention disclosed herein are presented in the context of concentrating solar power, the apparatus and methods are generally applicable to any pointing system in which light is redirected onto one or more fixed and/or moving targets.

The present invention appreciates that the diffraction pattern for light that is both diffracted and redirected by a heliostat is a function of how the light redirecting element is aimed. This means that the aim of the light redirecting element can be precisely determined once the aim of the diffracted light is known. Advantageously, the characteristics of diffracted light indicative of how the diffracted light is aimed can be determined from locations outside the zone of concentrated illumination in which sensors are at undue risk. This, in turn, means that diffracted light characteristics can be detected at a safe location, and this information can then be used to help precisely aim the light redirecting element onto the desired target, such as a receiver in a CSP system. The aim of the diffracted light is thus an accurate proxy for the light beam to be aimed at the receiver.

Advantageously, one or more centralized sensors can be used to aim multiple light redirecting elements. This means that common sensor(s) can detect diffraction characteristics of multiple heliostats. This facilitates incredibly simple implementation of the control system in large or small heliostat arrays in which the array is deployed over a large or small area.

The system is extremely accurate. For example, the sun diameter generally spans about ½ degree of the sky. In more preferred embodiments, the pointing control system of the invention may provide accuracy of at least $1/20^{th}$ of a degree so that the sun, not the system, is the limiting factor on accuracy.

Diffracted light has different characteristics that are a function of how the light redirecting element is aimed. These include wavelength (color or frequency), intensity, diffraction orders, combinations of these, and the like. The present invention may detect and use one or more of these diffraction characteristics to aim light redirecting elements using closed loop control. In utility-scale CSP installations, control systems that comprise closed loop strategies advantageously facilitate cost-effective deployment of a large number of small heliostats. Such an architecture would otherwise be cost-prohibitive if each individual heliostat were to require careful installation, alignment, and calibration. Embodiments of the invention that use smaller heliostats are advantageously easier to handle and install, resulting in further cost reduction.

In preferred modes of practice, the present invention teaches that a portion of the incident light impinging on a light redirecting element can be diffracted into one or more diffraction orders. The diffracted light furthermore can be detected by suitable sensor(s) such as an imaging system proximal to the receiver target (nominal target location) but sufficiently spaced from the nominal target so the sensor(s) are outside a zone of concentrated illumination associated with undue risk of sensor damage. The detected property(ies) of the diffracted light, including wavelength and intensity, can be used by the control system to determine if the light redirecting element is oriented such that the non-diffracted, redirected light substantially impinges on the nominal target. Furthermore, the control system uses the detected diffraction information, such as wavelength and intensity information to know how to articulate and correct the aim of the light redirecting element when the redirected light does not substantially impinge on the target location.

The present invention teaches that a portion of the incident light impinging on a light redirecting element can be diffracted using a variety of different techniques. For example, a portion of the incident light can be diffracted using one or more diffraction gratings. Diffraction gratings are well known in the field of spectroscopy for their ability to split light into its constituent wavelengths or colors. While linear (one-dimensional) gratings may be used in the practice of the present invention, they are less preferred; the present invention teaches that intrinsically two-dimensional structures, such as circular (incorporating concentric rings) or spiral (incorporating single or multiple spiral features) gratings, are particularly advantageous for heliostat tracking. Such structures are capable of diffracting in two dimensions, thusly broadcasting light broadly into three dimensions.

Gratings can have uniform spacing between features or may have spacing variations as a function of location on the grating. Both the orientation and spacing of the grating lines affect the diffractive properties of the grating, allowing gratings to be tuned for specific applications.

While standard linear gratings can be used by the present invention, individual linear gratings provide more limited utility compared to 2-D gratings. By way of example, when used to sense pointing of the sun, in the non-dispersing direction, a single linear grating broadcasts light over only a very narrow angle of slightly less than ½ degree (the width of the sun.) Two linear gratings may be provided, oriented ½-degree differently from one another, to provide a 1-degree broadcast angle. Similarly, four linear gratings may be provided to provide a 2-degree broadcast angle, and so on.

Since many practical applications require broadcast angles of 90 to 360 degrees, a large number of linear gratings may be required to provide a sufficient broadcast angle. For this reason, two-dimensional gratings such as circular or spiral are preferred by the present invention.

In other embodiments, the present invention teaches that a portion of the incident light impinging on a light redirecting element can be diffracted using one or more diffractive elements in the form of an embossed or otherwise fabricated sheet (including a laminated sheet) incorporating one or more diffraction gratings, wherein the sheet in some modes of practice has been manufactured using techniques similar to those used to fabricate holographic stickers commonly used in commercial applications for security and authenticity validation. In some embodiments, the sheets may have diffraction features incorporated into two or more sub-elements. For instance, such a sheet may comprise an array comprising a plurality of spiral or circular diffraction gratings. Such manufacturing techniques easily implement diffractive optics and can produce complex diffraction patterns inexpensively compared to scientific-grade diffraction gratings. Sheets made using the techniques used to manufacture holographic stickers can be readily mass produced and can provide cost effective diffractive elements in the systems disclosed herein.

The present invention teaches that diffractive elements may be used with either reflective and/or transmissive light redirecting elements. In the case of reflective light redirecting elements, incident light hitting the diffractive element also is partially reflected by the diffractive element according to the laws of reflection. The pattern of the resultant diffractive orders is produced and positioned in a manner that correlates accurately relative to the vector of the reflected rays to be aimed at the desired target(s). Such reflected rays are also referred to herein as the $0^{th}$ diffraction order.

In the case of transmissive light redirecting elements, incident light is refracted and diffracted by the diffractive element and refracted or otherwise altered by the light redirecting element. An exemplary refractive light redirecting element is a refractive type optic such as a lens.

The present invention teaches that multiple diffractive elements may be used. Each diffractive element may be used to produce different diffractive properties with respect to a particular light redirecting element. This can be done for the purpose of extending the dynamic range of the feedback system and/or to eliminate ambiguities related to symmetries, such as positive and negative diffractive orders and multiple axes of rotation.

The present invention teaches that a single diffractive element may be used with respect to a particular light redirecting element, wherein the diffractive element incorporates multiple sub elements. This also can provide different diffractive properties for the purpose of extending the dynamic range of the feedback system and/or to eliminate ambiguities related to symmetries, such as positive and negative diffractive orders and multiple axes of rotation.

The present invention teaches that the detection features used to detect diffraction characteristics may be in the form of an imaging system proximal to the receiver target but at a safe distance so that the detection features avoid undue exposure risk to the concentrated light. The imaging system may include a plurality of imaging devices such as cameras and more specifically digital cameras capable of spatially and spectrally resolving diffractive elements mechanically coupled to light redirecting elements. The field of view of each imaging device is preferably fixed. Alternatively, the field of view may be adjustable via actuation capabilities such as pan and tilt actuation and/or zoom functionality. Similarly the total net field of view of a particular imaging device may include the entire set of diffractive elements in the system or a subset therein. Regardless of the field of view constraints of a given imaging device, the imaging system as a whole desirably has a field of view that together sufficiently covers the diffractive elements used for aiming control.

In one aspect, the present invention relates to a method of concentrating sunlight, comprising the steps of:
   a) redirecting and diffracting sunlight; and
   b) observing the diffracted sunlight; and
   c) using the observed diffracted sunlight in a closed loop control system to controllably actuate a plurality of light redirecting elements in a manner that concentrates the sunlight onto at least one target.

In another aspect, the present invention relates to a method of aiming re-directed sunlight, comprising the step of using a diffraction characteristic of the sunlight to aim the sunlight onto a target.

In another aspect, the present invention relates to a system for concentrating sunlight onto a centralized target, comprising:
   a) a plurality of heliostats, each heliostat comprising:
      i. a redirecting element that redirects incident sunlight;
      ii. a diffractive element that diffracts incident sunlight, wherein a characteristic of the diffracted sunlight is indicative of the orientation of sunlight redirected by the redirecting element;
   b) a device that observes the diffractive element; and
   c) a control system that uses observed diffracted light to determine a compensation that articulates the redirecting elements to concentrate the redirected sunlight onto the centralized target.

In another aspect, the present invention relates to a heliostat that redirects sunlight, comprising:
   a) a redirecting element that redirects incident sunlight; and
   b) a diffractive element that diffracts a portion of the sunlight incident on the heliostat, said diffractive element coupled to the redirecting element such that a characteristic of the diffracted sunlight is indicative of the orientation of sunlight redirected by the redirecting element.

In another aspect, the present invention relates to a heliostat system for concentrating sunlight onto a target, comprising:
   a) a plurality of heliostats that redirect, diffract, and concentrate sunlight onto the first centralized target; each heliostat comprising:
      i. a redirecting element that redirects incident light onto the centralized target; and
      ii. at least one diffractive element provided on the redirecting element;
   b) an imaging device comprising a field of view that observes the diffractive element; and
   c) a control system that uses a characteristic of the observed diffractive element to determine a compensation that articulates the redirecting elements to concentrate the redirected sunlight onto the centralized target.

In another aspect, the present invention relates to a closed loop pointing system that controls the pointing of a plurality of heliostats to concentrate light onto a centralized target, comprising:

a) a plurality of heliostats that diffract and redirect sunlight that is incident on the heliostats; and b) a control system that uses the diffracted sunlight to control the articulation of the heliostats so that the redirected sunlight is concentrated onto the centralized target.

BRIEF DESCRIPTION OF THE DRAWINGS

FIG. 10b shows an exploded perspective view of the imaging device of FIG. 10a;

FIG. 12a is a schematic diagram of an exemplary imaging subsystem;

FIG. 12b is a schematic diagram of an exemplary imaging subsystem;

FIG. 22 is an exemplary tracking system with a single target;

FIG. 23 is an exemplary tracking system with a plurality of targets and

FIG. 24 is an exemplary tracking system with a plurality of targets.

DETAILED DESCRIPTION OF THE PREFERRED EMBODIMENTS

Figure 1:
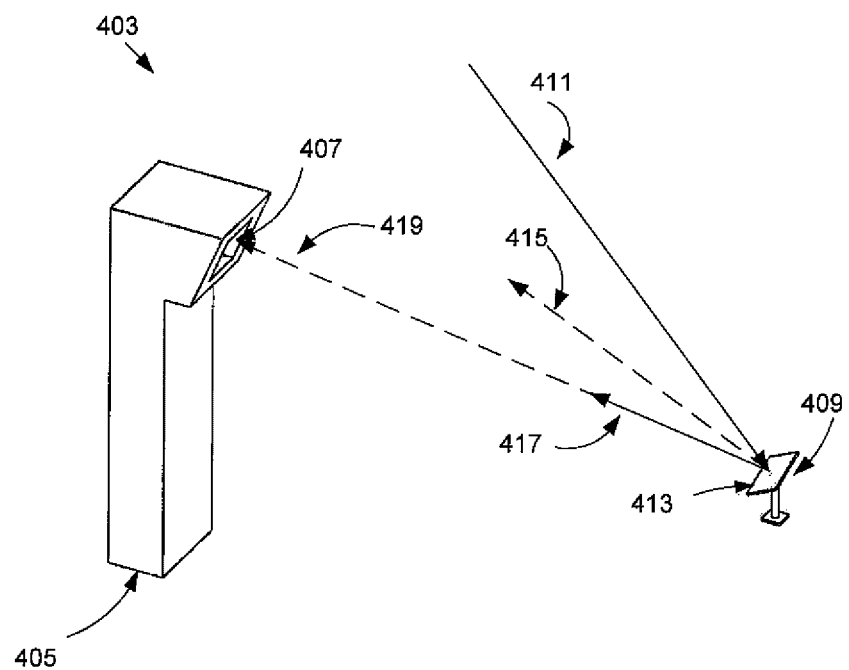
FIG. 1 is a simplified perspective view of an exemplary concentrating solar power system.

The apparatus and methods presented herein describe closed loop tracking systems that use diffractive properties of light to sense orientation and effect articulation of a plurality of light redirecting elements in a preferred manner. Embodiments described herein are exemplary and do not represent all possible embodiments of the principles taught by the present invention. In particular, embodiments of the present invention have direct application in the field of concentrating solar power, particularly concentrating solar power including the use of heliostats to redirect sunlight onto a fixed focus in which concentrated sunlight may be converted into other forms of energy such as heat or electrical energy. Nevertheless, the apparatus and methods described herein can be applied and adapted by those skilled in the art for use in alternative applications in which light from a source must be redirected onto a plurality of targets, particularly light from a source that is not stationary.

FIGS. 2A-2C and 3 show an exemplary CSP system 1 incorporating principles of the present invention that is deployed for purposes of illustration on mounting surface 21, which may be a roof of a building in some embodiments. CSP system 1 includes an array of heliostats 9 that redirect and concentrate sunlight onto focus area 7 of tower 5. An imaging subsystem 11 is mounted to tower 5 to detect diffraction information produced by heliostats 9.

A control system (not shown) uses the detected diffraction information in a closed loop control system to articulate and thereby aim redirected sunlight from the heliostats 9 onto focus area 7. The control system desirably includes a plurality of computational devices (not shown) coupled electronically to imaging subsystem 11 and heliostats 9. The control system includes software to process diffraction information acquired by imaging subsystem 11 in order to effect articulation of the plurality of heliostats 9 for the purpose of controllably redirecting sunlight onto the system focus area 7.

Each heliostat 9 generally includes diffractive element 23, a light redirecting element in the form of reflecting element 25, and a support structure including pivot mechanisms 27 and 31, mechanical support 33, and base 35. The diffractive element 23 and its associated reflecting element 25 form an assembly that articulates so that the assembly can track the sun and aim redirected sunlight onto the focus area of tower 5. Diffractive element 23 is coupled to reflecting element 25 so that the diffraction information produced from the diffractive element 25 can be used to controllably aim light redirecting element 25 via aiming strategies comprising closed loop control techniques optionally in combination with other control strategies, e.g, open loop control and/or feedforward techniques. In particular, imaging subsystem 11 detects diffraction information produced by diffractive element 23. The information correlates to the manner in which reflecting element 25 is aimed. Accordingly, the information can be used to articulate reflecting element 25 in a manner effective to correct and/or maintain the aim of redirected light onto focus area 7.

Pivot mechanism 31 is mechanically coupled to support structure 34 and incorporates tip axis 33 such that tip axis 33 is fixed relative to the orientation of the support structure 34. Pivot mechanism 27 is pivotably coupled to pivot mechanism 31 and can be actuated to pivot on tip axis 33. Pivot mechanism 27 incorporates tilt axis 29 such that tilt axis 29 has an orientation that is a function of the rotation of pivot mechanism 31 about the tip axis 33. Reflecting element 25 is pivotably coupled to pivot mechanism 27 and can be actuated to pivot on tilt axis 29. Pivot mechanisms 27 and 31 provide two degrees of rotational freedom about axes 29 and 33, respectively, for articulating the reflecting element 25 and diffractive element 23. The orientation and position of reflecting element 25 and diffractive element 23 are thereby affected by both rotational degrees of freedom provided by tip axis 33 and tilt axis 29. In the embodiment shown tilt axis 29 and tip axis 33 are substantially orthogonal to each other but do not lie on the same plane. Articulation of the components around axes 29 and 33 allows the reflecting element 25 to be controllably aimed at focus area 7.

The embodiment of heliostat 9 shown in FIGS. 2A-2C and 3 incorporates two rotational degrees of freedom for articulating the diffractive element 23 and reflecting element 25. In an alternative embodiment, the orientation and position of the diffractive element 23 and reflecting element 25 may be affected by zero or more rotational degrees of freedom and one or more translational degrees of freedom. In yet another alternative embodiment, the orientation and position of the diffractive element 23 and reflecting element 25 may be affected by one or more rotational degrees of freedom and zero or more translational degrees of freedom.

Diffractive element 23 preferably is located on reflective element 25 in such a manner that diffractive element 23 can be observed by imaging subsystem 11 irrespective of orientation of reflective element 25 over the functional articulation range of heliostat 9. For purposes of illustration, FIG. 2c shows diffractive element 23 centrally located along a top edge of reflecting element 25. Other positioning strategies may be used such as those described below with respect to FIGS. 4A-4D.

In addition to the functional articulation range of individual heliostat devices 9, the ability to observe diffraction element 23 by imaging subsystem 11 is affected by the position and orientation of the heliostats 9 relative to the imaging subsystem 11 and the proximity of heliostats 9 to one another. Consequently it is possible in some embodiments that portions of reflecting element 25 might be obstructed by one or more other reflecting elements 25 of other heliostats 9 from the viewpoint of the imaging subsystem 11. Because of this, in some embodiments there may be regions on reflective surface 25 where it is not practical to locate diffractive element 23.

Diffractive element 23 preferably has a sufficient size such that diffractive element 23 can be resolved by imaging subsystem 11 over the functional articulation range of heliostat 9. At the same time, it is also preferable to minimize the area of diffractive element or elements 23 such that these occupy a small fraction of the total area of reflecting element 25. This is particularly true in the case of a concentrating solar power system in which efficiency is affected by the net reflecting area of the heliostat 9. Consequently the minimum size of diffractive element 23 is dependent on the resolution of imaging subsystem 11, and the location of the diffractive element 23 relative to the imaging subsystem 11. As a limiting factor, the minimum area of diffractive element 23 is determined by the resolution of the imaging subsystem 11 and the location of the most distant heliostat 9 in the system 3.

In one embodiment of tracking control system 1, all diffractive elements 23 among the heliostats 9 or a particular subset of heliostats 9 have areas that are substantially uniform in magnitude. Having all diffractive elements substantially uniform in size advantageously reduces manufacturing complexity and requires less specificity when installing heliostats 9 to ensure that heliostats 9 are located properly relative to imaging subsystem 11. A disadvantage of this embodiment is that the amount of power that could be generated by a given CSP system is not maximized, as some of the diffractive elements 23 will be larger than needed to ensure that all the elements 23 in the array can be resolved by the imaging subsystem 11 regardless of distance from subsystem 11.

An alternative embodiment incorporates diffractive elements 23 having a plurality of sizes such that the area of diffractive elements 23 is correlated, e.g., inversely proportional, to their distance from imaging subsystem 11. The embodiment has an advantage in that it can be designed so that the effective area of diffractive elements 23 in the image space of imaging subsystem 11 is substantially uniform. Additionally this embodiment increases the total throughput of a CSP system by minimizing parasitic losses from diffractive elements 23 that are too large with respect to some heliostats 9. The major disadvantage to this embodiment is in increased manufacturing and installation complexity.

The shape of diffractive element 23 as shown is substantially square, but a variety of shapes may be used. In alternative embodiments the shape of diffractive element 23 may have a substantially rectangular shape. In yet another alternative embodiment the shape of diffractive elements 23 may be substantially circular. In still another alternative embodiment the shape of diffractive element 23 may have a freeform outline. Furthermore embodiments of the present invention may include diffractive elements 23 having a plurality of shapes.

Imaging subsystem 11 is used to detect or otherwise capture diffraction information produced by diffractive elements 23. The subsystem 11 is able to detect, sense, observe, or otherwise capture diffraction information including but not limited to intensity and color of light reflected, scattered, or diffracted by diffractive elements 23. The diffraction information correlates to the aim of reflecting elements 25, and therefore can be used by a control system to aim and concentrate redirected sunlight from heliostats 9 onto focus area 7.

Imaging subsystem 11 generally includes a plurality of sensors preferably in the form of imaging devices 28. In one embodiment, each imaging device 28 is a commercially available digital camera device. In an alternative embodiment, imaging device 28 is to varying degrees a customized device. Imaging devices 28 are mechanically coupled to a support structure 30 and arranged proximal to focus area 7. Support structure 30 is mechanically coupled to tower 5 proximal to focus area 7. In another embodiment, support structure 30 is mechanically coupled to the focus area 7. In another embodiment, support structure 30 is mounted to a separate structure other than tower 5.

As illustrated, imaging devices 28 are arranged about the focus 7 in a generally radially symmetric fashion. Other arrangements may be used. For example, an alternate embodiment of imaging subsystem 11 includes a plurality of imaging devices 28 that are arranged about focus 7 in a generally linear symmetric manner. In an alternative embodiment, imaging subsystem support structure 30 is substantially free standing, being independently mechanically coupled to mounting surface 21. Imaging devices 28 are sufficiently close to focus area 7 so that detected diffraction information can be used in a closed loop control system to actuate reflecting elements 25 for aiming at focus area 7. However, the devices 28 are far enough away from focus area 7 to avoid undue risk that the devices 28 would be damaged by concentrated sunlight.

Imaging subsystem 11 includes a plurality of imaging devices 28 having suitable field of view characteristics by which the plurality of diffractive elements 23 are observed. In one exemplary embodiment, each imaging device 28 has an effective field of view such that it can observe the entire plurality of diffractive elements 23 either statically or by the use of opto-mechanical mechanisms or other actuation techniques allowing a plurality of fields of view. In an alternative embodiment individual imaging devices 28 have an effective field of view to observe a subset of the plurality of diffractive elements 23 either statically or by use of optic-mechanical mechanisms allowing a plurality of fields of view. In such an embodiment the union of the plurality of fields of view includes the entire plurality of diffractive elements 23. In another alternative embodiment a plurality of subsets of imaging devices 28 have effective fields of view such that their intersection and union of observable diffractive elements are equivalent with a given subset and/or the union of all effective fields of view includes the entire plurality of diffractive elements 23.

Generally, it desirable that imaging devices 28 provide a color imaging function having sufficient spectral resolution to measure variations in the orientation of diffractive element 23 within fractions of one degree of actuation of reflecting elements 25. The required spectral resolution is a function of the diffractive properties of diffractive element 23. In some embodiments of diffractive element 23, the required spectral resolution is such that a 10-bit color imaging device provides sufficient resolution to measure the orientation of diffractive element 23. Such embodiments advantageously reduce the cost of imaging device 28. In other embodiments of diffractive element 23, the required spectral resolution is such that a 24-bit color imaging device provides sufficient resolution to measure the orientation of diffractive element 23.

In addition to providing sufficient spectral resolution, imaging devices 28 must also provide sufficient spatial resolution of diffractive elements 23 included inside respective field of view or views. Spatial resolution of imaging device 28 is affected by the size of pixels provided by focal plane array 131, and optical properties of lenses 127. Whether a given diffractive element 23 can be sufficiently resolved depends on these factors, as well as, the physical dimensions of diffractive element 23, the position of the diffractive element 23 within the field of view, and the distance between diffractive element 23 and imaging device 28. For a given diffractive element 23 within the effective field of view of imaging device 28, the minimum spatial resolution preferably is such that diffractive element 23 can resolve at least a single pixel in the image space of imaging device 28. Because the orientation of diffractive element 23 relative to imaging device 28 is not fixed but can vary within the range of its associated articulation mechanism, the size of diffractive element 23 in the image space of imaging device 28 is not fixed but is rather a function of diffractive element 23 orientation. Consequently, the spatial resolution of imaging device 28 must be sufficient to resolve diffractive element 23 to a minimum of a single pixel in image space over the full range of orientation of diffractive element 23.

In one embodiment the spatial resolution of imaging device 28 is such that for each diffractive element 23 included in the effective field of view the minimum respective size in image space is a single pixel over the range of articulation orientations. Such embodiment advantageously minimizes the required resolution of imaging device 28 and consequently the cost of the device as cost is generally directly proportional to spatial resolution.

In an alternative embodiment, the spatial resolution of imaging device 28 is such that for each diffractive element 23 included in the effective field of view the minimum respective size in image space is an n×m array of pixels over the range of articulation orientations where n and m are integers where at least one of the integers is greater than 1. Such embodiment does not necessarily minimize the spatial resolution of imaging device 28, however, it advantageously provides a resolution margin. Additionally such embodiments enable imaging device 28 to be deployed in tracking control systems 1 having varying topologies and number of diffractive elements 23 with its effective field of view.

Figure 4A:
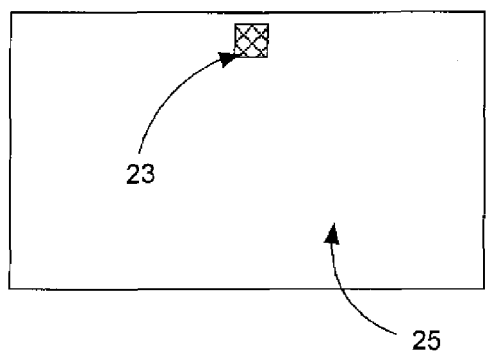
FIGS. 4A through 4D schematically show front views of exemplary reflective elements fitted with exemplary diffractive elements of the present invention.

FIGS. 4A through 4D schematically show front views of exemplary reflective elements fitted with exemplary diffractive elements of the present invention. FIG. 4a shows an embodiment of diffractive element 23 on reflective element 25 according to the heliostat 9 of FIG. 2c such that diffractive element 23 is substantially centered in the horizontal direction and substantially along the top edge of reflective element 25. Such location of diffractive element 23 is advantageous in concentrating solar power systems as it minimizes the risk that diffractive element 23 would be obstructed by neighboring heliostats throughout a full range of functional articulation.

Figure 4B:
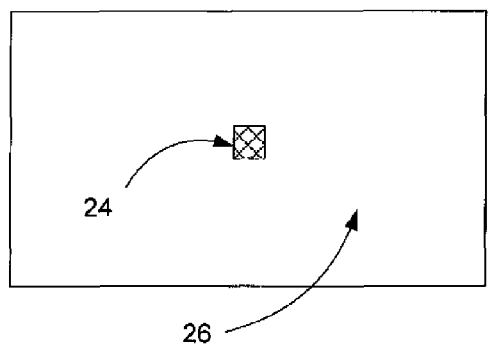

FIG. 4b shows diffractive element 24 substantially close to the center of reflecting element 26. This embodiment may allow obstruction-free observation of diffractive element 24 but may impose a minimum spacing requirement on a CSP system. This embodiment may provide an advantage in minimizing the displacement of diffractive element 24 as a function of rotation of elements 26 and 24 about tip and tilt axes provided that element 24 is located proximal one or more axes of rotation.

Figure 4C:
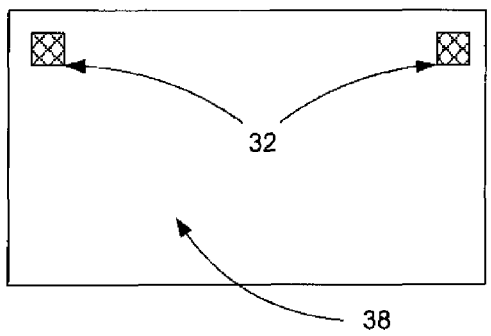
Figure 4D:
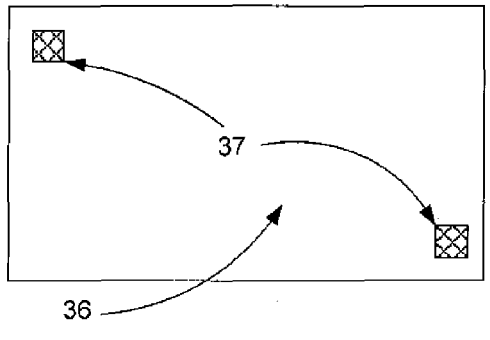

In yet another alternative embodiment of FIG. 4c, a plurality of diffractive elements 32 are provided on reflective element 38. The location of diffractive elements 32 are such that at least one diffractive element 32 is not obstructed over the functional articulation range. Such exemplary embodiments include locating two diffractive elements 32 substantially proximal to adjacent corners of reflecting element 38. FIG. 4d shows a similar embodiment in which diffractive elements 37 are positioned at opposite corners of reflecting element 36. Still yet other alternative embodiments may locate any number of diffractive elements on a corresponding reflecting element.

Figure 5:
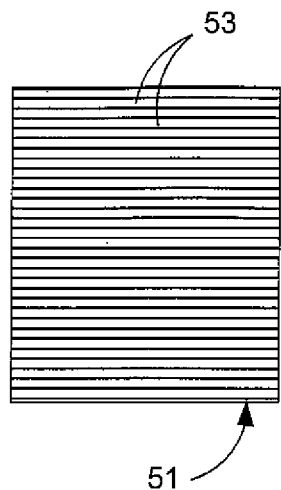
FIG. 5 schematically shows a front view of a linear diffraction grating.

To understand the use of diffractive elements in the practice of the present invention, we will review the operation of linear diffraction gratings. FIG. 5 shows a linear diffraction grating 51 having regularly spaced grating lines 53. Diffraction gratings have long been used in devices such as spectrometers to split polychromatic light into its constituent colors in order to characterize the light source or the material that is reflecting/absorbing the light. There are various types of linear diffraction gratings, but in principle they generally incorporate a set of parallel grooves or lines suitably sized and spaced for diffraction, e.g., on the order of the wavelength or even 10× or more of the light band to be diffracted. The spacing of the grooves sets up constructive and destructive interference that result in light of different wavelengths constructively interfering at different angles relative to the incident light beam. Consequently white light passing through a transmission grating or reflecting off of a reflective grating will generate a spectrum of colors similar to the effect of a rainbow. The diffraction angle is a function of both the line spacing, the wavelength of the diffracted light, and the angle of incidence on the grating. The equation below gives the relationship between the diffraction angle $\theta_m$, the groove spacing d, the incidence angle $\theta_i$ and the wavelength $\lambda$. The equation has multiple solutions since the interference maxima are periodic. The integer m is the diffraction order and can be positive, negative, or 0.

$$d(\sin(\theta_m)+\sin(\theta_i))=m\lambda \quad (1)$$

The m=0 or $0^{th}$ order diffraction is a special case and is equal to the angle of reflection in the case of a reflective grating or the angle of refraction in the case of a transmission grating.

Figure 6A:
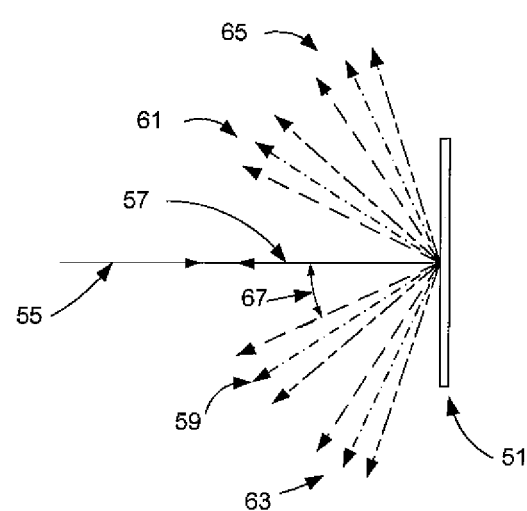
FIG. 6A is a side view of the linear diffraction grating of FIG. 5 illuminated by an on axis light ray.

FIG. 6A shows reflective linear diffraction grating 51 of FIG. 5 viewed on edge and being illuminated with a single polychromatic ray of light 55 that impinges on the diffraction grating 51 perpendicular to its plane. The grating reflects the light, ray 57 and also diffracts the light into multiple diffractive orders 59 through 65. Each diffractive order is represented schematically by three monochromatic light rays. Angle 67 represents the angle between the $0^{th}$ order reflected light ray 57 and the $1^{st}$ order diffracted ray 59. From the above equation we see that angle 67 is independent of the angle of incidence. This means that detection of any of rays 59 through 65 provides information concerning the location of reflected ray 57.

Figure 6B:
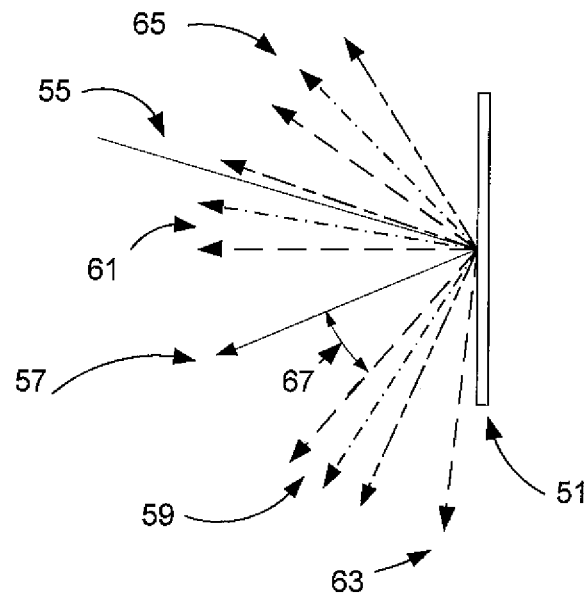
FIG. 6B is a side view of the linear diffraction grating of FIG. 5 illuminated by an off axis light ray that is orthogonal to the diffraction lines.

FIG. 6B shows incident ray 55 impinging on grating 51 of FIG. 5 at non normal incidence. The reflected $0^{th}$ order ray 57 reflects from grating 51 at an angle that is equal to the angle of incidence of ray 55. The $1^{st}$ order diffracted rays 59 maintains the same angular separation 67 relative to the $0^{th}$ order reflected ray as does the $-1^{st}$ order rays 61 regardless of the angle of incidence of ray 55. The same is true for higher order diffracted rays 63 and 65.

Referring to FIGS. 6A and 6B, one skilled in the art will appreciate that a ray of light diffracted from a linear grating 51 is dispersed in one dimension only, into a narrow plane. In the case of a light source like the sun that is less than ½ degree in size, the dispersed light will be confined to a narrow ½-degree region of space.

Further consideration of this result illustrates that a linear diffraction grating although useful is less than optimum to serve as a more preferred diffraction element 23 of the present invention, since the diffracted light is not observable by an imaging detector 28 unless it happens to lie in that narrow ½-degree region of space, and can be readily detected by more than one of the detectors 28 in only the most fortuitous of circumstances. Further, as the sun moves through the sky during the day and light redirecting element 25 changes angles, this ½-degree region of space moves widely across the sky.

To solve this problem, more preferred embodiments of the present invention introduce using a diffraction element that has structure in two dimensions, that broadcasts light broadly into three dimensions, so that a large two-dimensional area proximal to target 7, including at least the area including imaging detectors 28, is illuminated by the broadcast light.

Figure 7A:
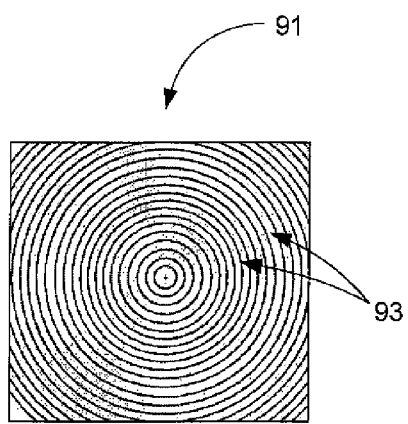
FIG. 7A-C is a front view of exemplary diffractive element including concentric or spiral diffraction lines.
Figure 7B:
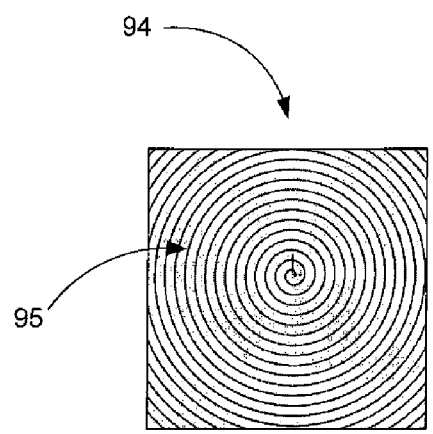

The present invention teaches that preferred embodiments of diffractive elements incorporate a circular or spiral grating. For example, FIG. 7a shows diffractive element 91 having a circular grating formed from concentric rings 93. FIG. 7b shows diffractive element 94 having spiral grating 95. Other less preferred embodiments may use superposed and/or an array of linear gratings that increase the window for observing diffraction effects as compared to a further less preferred embodiment, wherein only a single linear grating is used.

The aforementioned embodiments describe diffractive elements including sub-elements having uniformly spaced diffraction lines. Alternative embodiments may include sub-elements having non-uniformly spaced diffraction lines. Likewise alternative embodiments may include a plurality of sub-elements having diffraction lines arranged so that respective lines are parallel but having different spacing. Diffractive elements including sub-elements with a plurality of line spacings advantageously allow diffractive elements to provide greater dynamic range by tuning the diffractive orders to overlap.

Figure 7C:
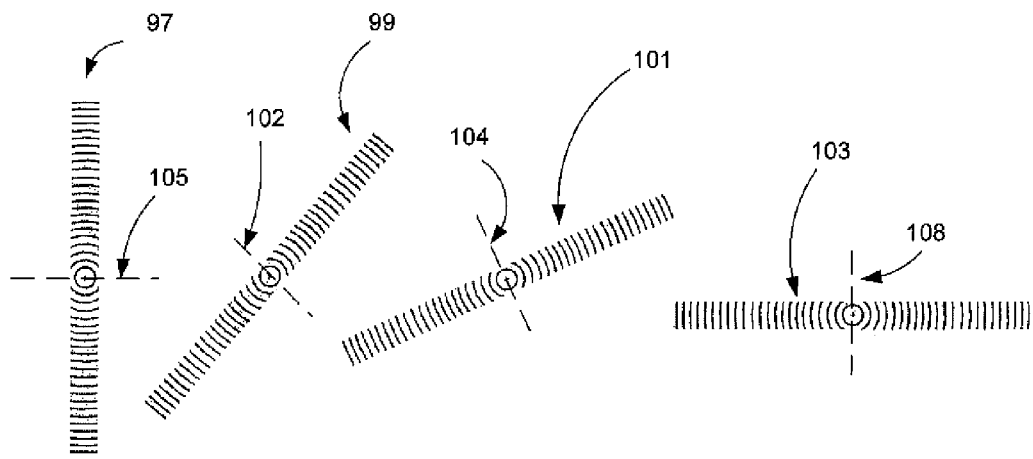

Advantageously, circular and spiral gratings effectively provide a continuous set of linear gratings about their center point. This is schematically shown in FIG. 7c. Consider narrow portion 97 of diffractive element 91 (FIG. 7a). This portion 97 approximates a linear grating with horizontal lines and thereby will generate a diffraction spectrum when illuminated by light orthogonal to the horizontal axis 105. Likewise, portions 99, 101, and 103, respectively, approximate linear diffraction gratings having a diffractive axes 102, 104, and 108 orthogonal to the angle of the cross section, respectively. In the limit that the width of the cross-section goes to zero, there are an infinite number of linear diffraction gratings having diffraction axes completely filling 0° to 360°. The same benefits are provided by circular and spiral gratings. Advantageously, circular or spiral gratings overcome the problems of non-linear effects encountered with linear gratings and are more preferred.

Figure 8A:
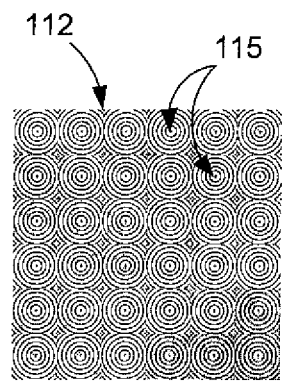
FIG. 8A is a front view of an exemplary diffractive element including a plurality of concentric or spiral diffraction lines.
Figure 8B:
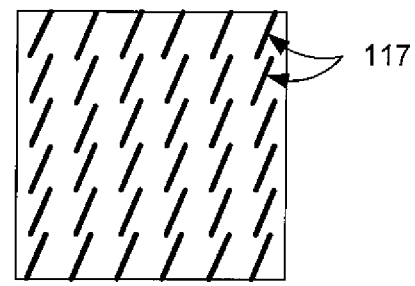
FIG. 8B is a front view illustration of observed spectra of an exemplary diffractive element.

A single circular or spiral grating, however, does have a disadvantage that the width of the observed spectrum is confined to a narrow line proportional to the angular width of the illuminating source. Consequently such gratings may require a higher resolution imaging subsystem than might be desired in order to observe diffraction spectra of all diffractive elements in the tracking control system 1. Accordingly, to overcome resolution limitations of single circular or spiral gratings, alternative embodiments of more preferred diffractive elements preferably include a plurality of circular or spiral gratings arranged in a two dimensional array. For example, referring to FIG. 8a, diffractive element 112 includes a plurality of circular or spiral grating sub-elements 115. Each sub-element 115 is capable of diffracting incident light in all diffractive axes that when viewed from a relatively close view point can be resolved as a set of parallel spectra 117 as shown in FIG. 8B, e.g., one spectrum for each sub-element 115 in FIG. 8a. When viewed from relatively far away, the set of parallel spectra 117 of FIG. 8B are resolved as a single spectrum.

Other embodiments of diffractive elements use sheets incorporating diffraction gratings, similar to the techniques used to make holographic stickers, to produce diffraction information in ways that are more cost effective than using other kinds of linear, spiral, and/or circular gratings. The sheets may be single layers or a laminate of two or more layers. In particular, holographic manufacturing techniques may generate specific dot matrix patterns for a high level of control of the diffractive properties that approximate the effect of linear and circular gratings described herein. Advantageously, holographic manufacturing techniques advantageously provide a low cost method to manufacture high volumes of diffractive elements, as evidenced by the readily available low cost holographic stickers commonly used for security and authentication purposes on consumer goods and packaging.

Figure 9A:
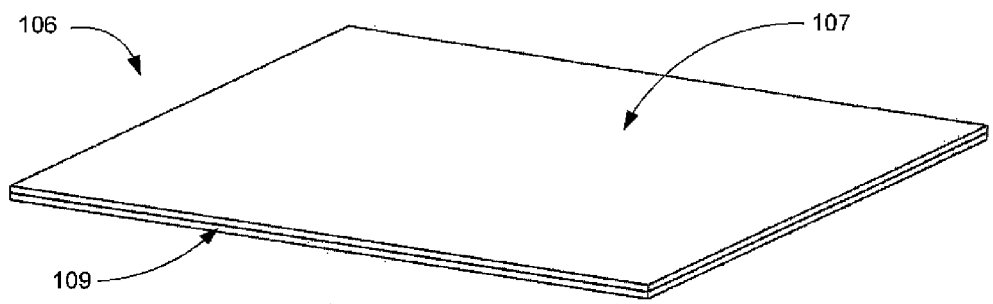
FIG. 9A-C is a perspective view of exemplary layered diffractive elements.
Figure 9B:
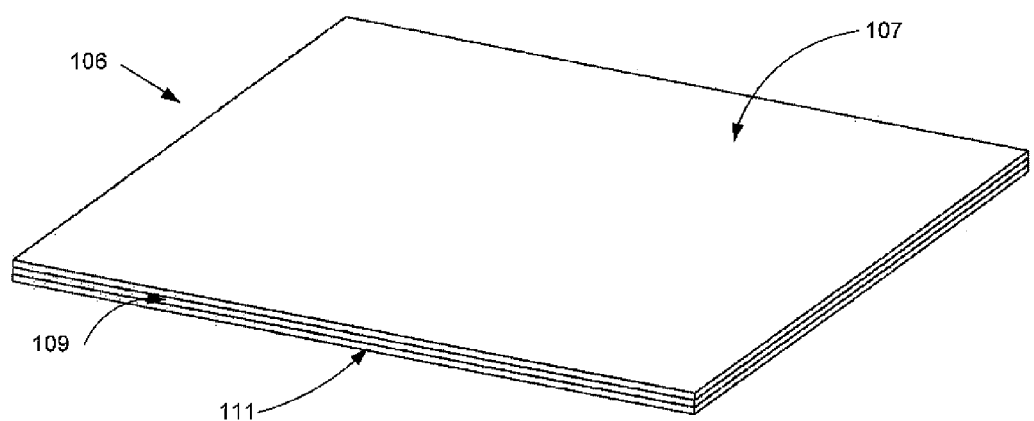
Figure 9C:
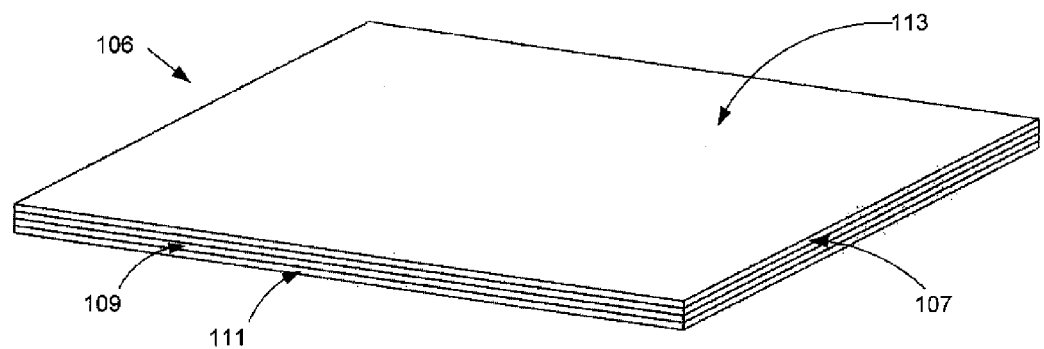

To illustrate this, FIGS. 9A through 9C schematically show another embodiment of a diffractive element 106 that includes a plurality of layers including a diffractive layer 107. Diffractive layer 107 is in the form of an embossed or otherwise fabricated sheet (including a laminated sheet) incorporating one or more diffraction gratings. Desirably, the sheet in some modes practice has been manufactured using techniques similar to those used to fabricate holographic stickers. Element 106 further includes an adhesive layer 109. Diffractive layer 107 provides any of the aforementioned diffractive properties whereas adhesive layer 109 provides a mechanism by which to mechanically couple diffractive element 106 to a reflective element or associated structure. Diffractive element 106 may include a removable backing layer 111 that prevents diffractive element 106 from prematurely adhering to other entities. This advantageously allows diffractive element 106 to be manufactured in volume, stored, and handled efficiently prior to the removal of backing layer 111 and coupling to a reflective element during assembly. Optionally, diffractive element 106 may include a UV resistant layer 113 applied over diffractive layer 107 that increases the lifetime of diffractive element 23 when exposed to UV doses as in the case of outdoor sun exposure. As another option, the diffractive layer 107 itself may include UV resistant components such as dyes that improve the lifetime under outdoor sun exposure. Furthermore, diffractive element 106 may include additional layers that provide additional diffractive layers, and or mechanical advantages such as stiffness to improve repeatability during the manufacturing or assembly processes.

Figure 10A:
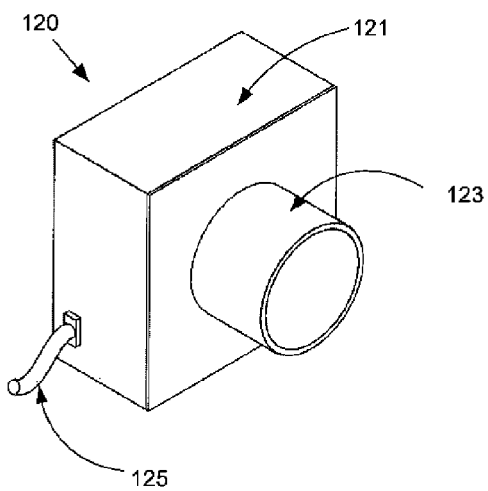
FIG. 10a shows a perspective view of an exemplary imaging device.
Figure 10B:
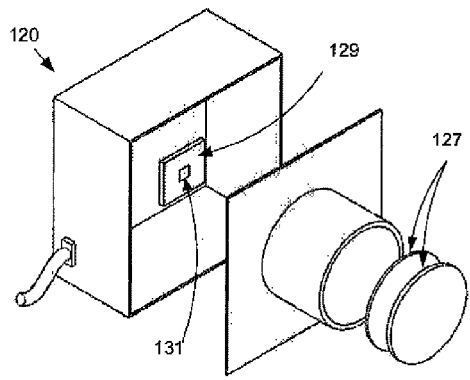

FIGS. 10a and 10b show an exemplary imaging device 120 suitable in the practice of the present invention. Imaging device 120 includes a mechanical housing 121, lens housing 123, and electronic interconnect 125. Mechanical housing 121 provides general structural support and environmental protection of imaging electronics 129. Likewise lens housing 123 positions and protects one or more lenses 127. Imaging electronics 129 includes a focal plane array 131 onto which lenses 127 image objects within the field of view imaging device 120.

Figure 2A:
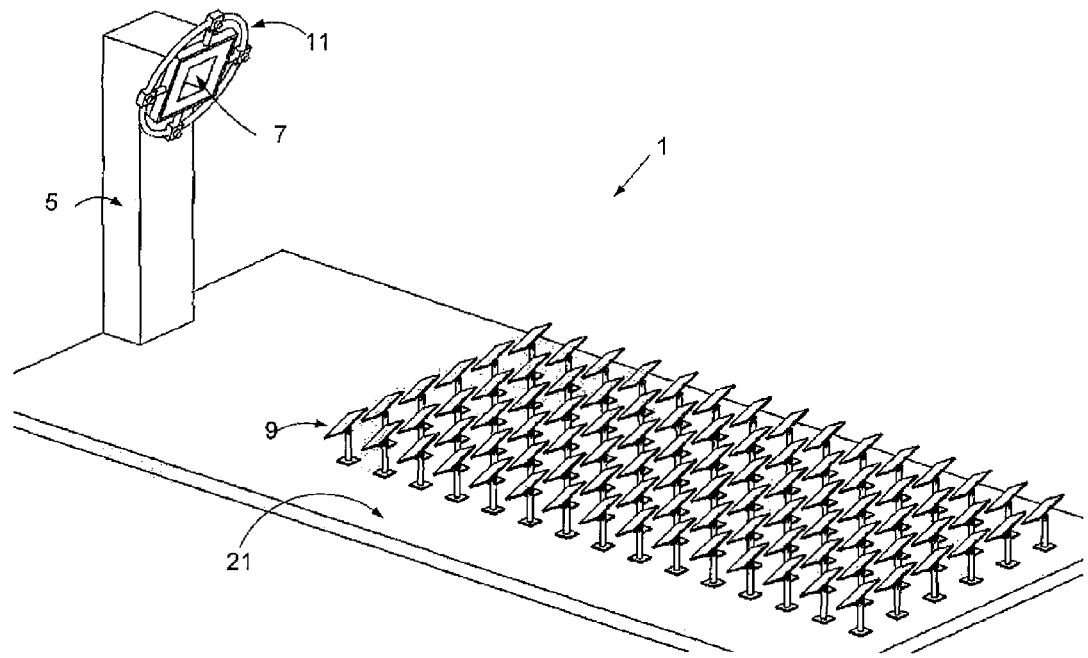
FIG. 2A is a perspective view of an exemplary embodiment of the present invention applied to a concentrating solar power system.
Figure 2B:
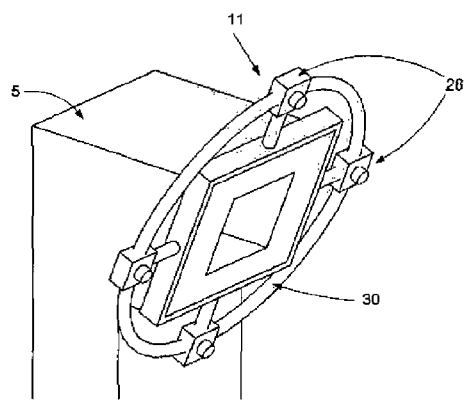
FIG. 2B is a perspective view of an exemplary imaging subsystem of the present invention applied to a concentrating solar power system.
Figure 2C:
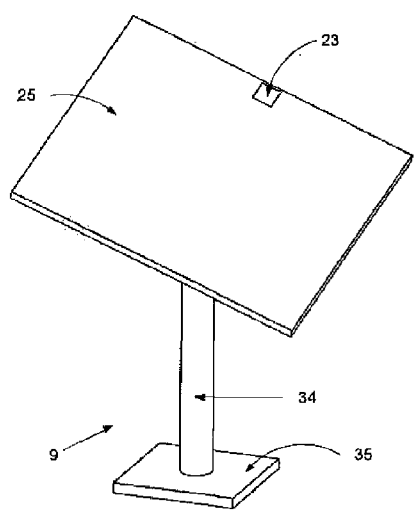
FIG. 2C is a perspective view of an exemplary heliostat with an exemplary diffractive element of the present invention.
Figure 3:
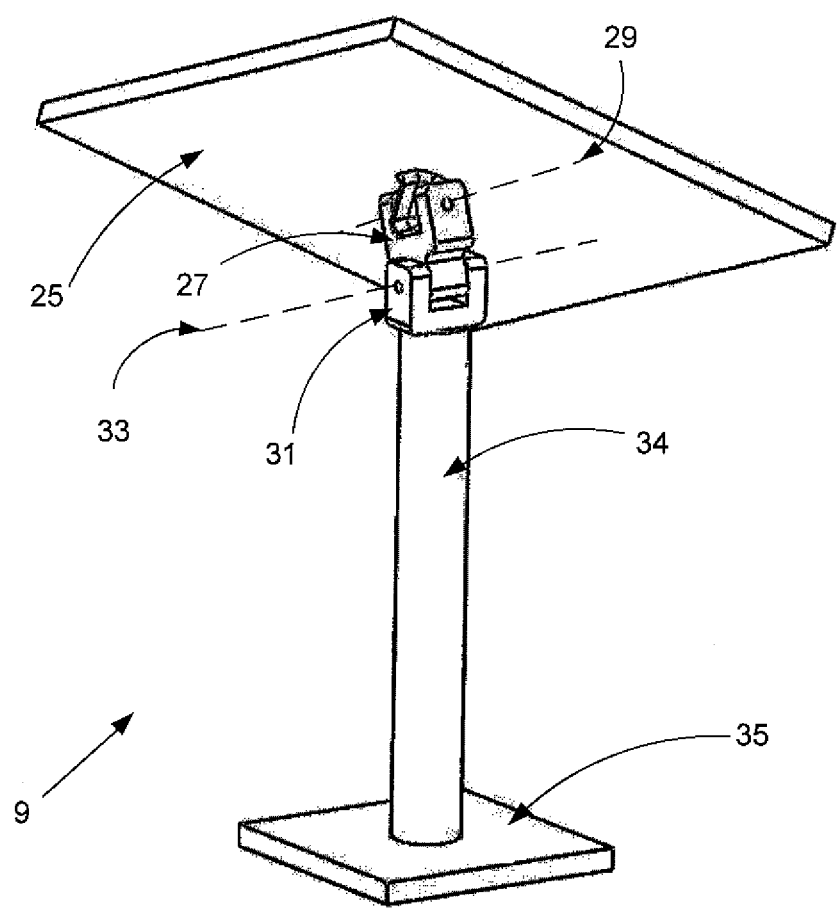
FIG. 3 is a perspective view of an exemplary heliostat.
Figure 11:
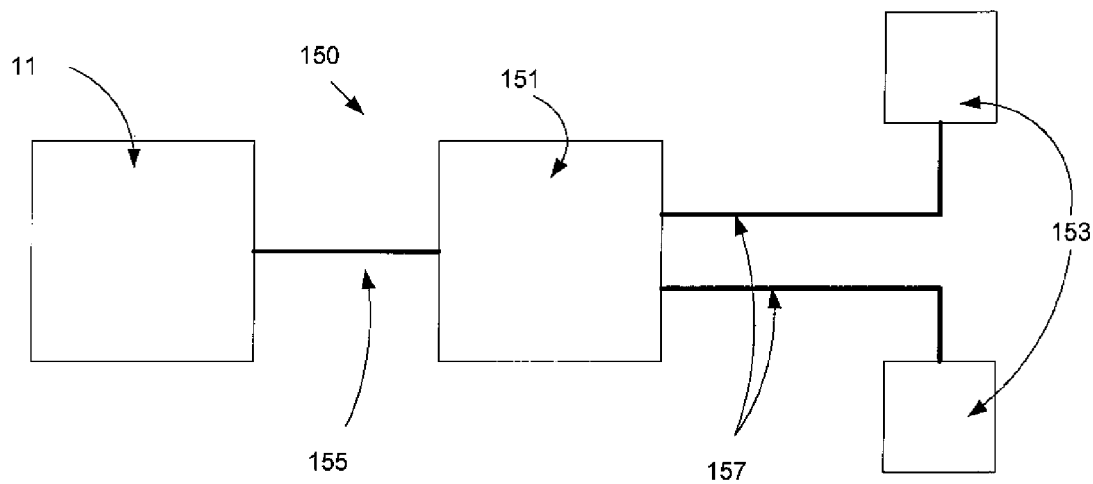
FIG. 11 is a schematic diagram of an exemplary tracking control system incorporating an imaging subsystem.

FIG. 11 shows how imaging subsystem 11 shown in FIGS. 2A and 2B may be incorporated into a tracking control system 150 of the present invention. The tracking control system 150 includes imaging subsystem 11, computation subsystem 151, and a plurality of articulation subsystems 153. Imaging subsystem is electronically coupled to computation subsystem 151 via interconnect 155 by which computation subsystem 151 acquires image data. Computation subsystem 151 is likewise electronically coupled to a plurality of articulation subsystems 153 via interconnects 157 by which computation subsystem 151 delivers pointing instructions to and receives status telemetry from articulation subsystems 153. Electronic interconnects 155 and 157 may be realized by wired and/or wireless communication topologies. The articulation subsystems 153 actuate corresponding heliostats (not shown) to aim redirected light at a desired target.

FIGS. 12a and 12b show illustrative embodiments of imaging subsystem 11. Referring to FIG. 12a, imaging subsystem 11 includes a plurality of imaging devices 152 connected independently or through a common electronic bus 155 to computation subsystem 151 (shown in FIG. 11). In an alternative embodiment of FIG. 12b, imaging subsystem 11 further includes image processing controller 159 coupled electronically to a plurality of imaging devices 152 via a plurality of interconnects 161. Interconnects 161 include wired and/or wireless communication topologies. Image processing controller 159 provides localized coordination of one or more of the following functions that include image acquisition, image pre-processing, and image transmission to computation subsystem 151 (FIG. 11) via interconnect 155.

Figure 13A:
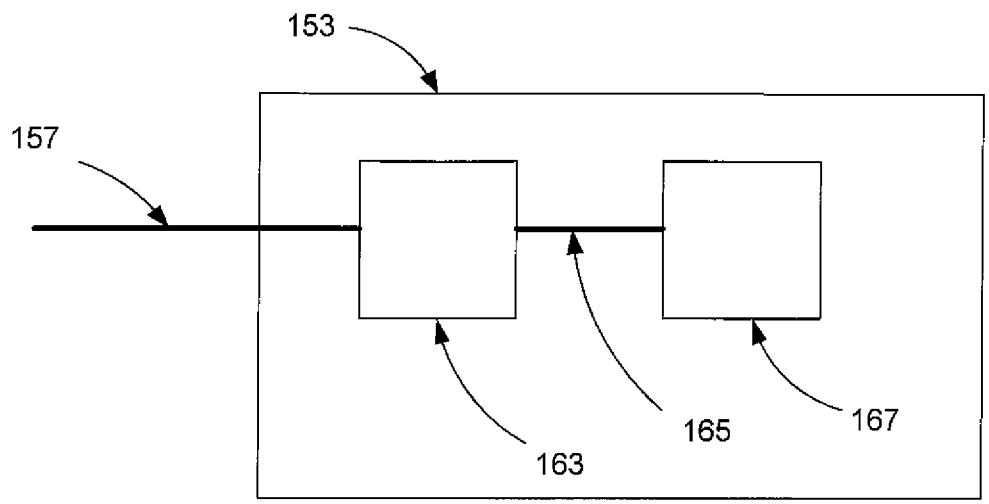
FIG. 13a is a schematic diagram of an exemplary articulation subsystem.
Figure 13B:
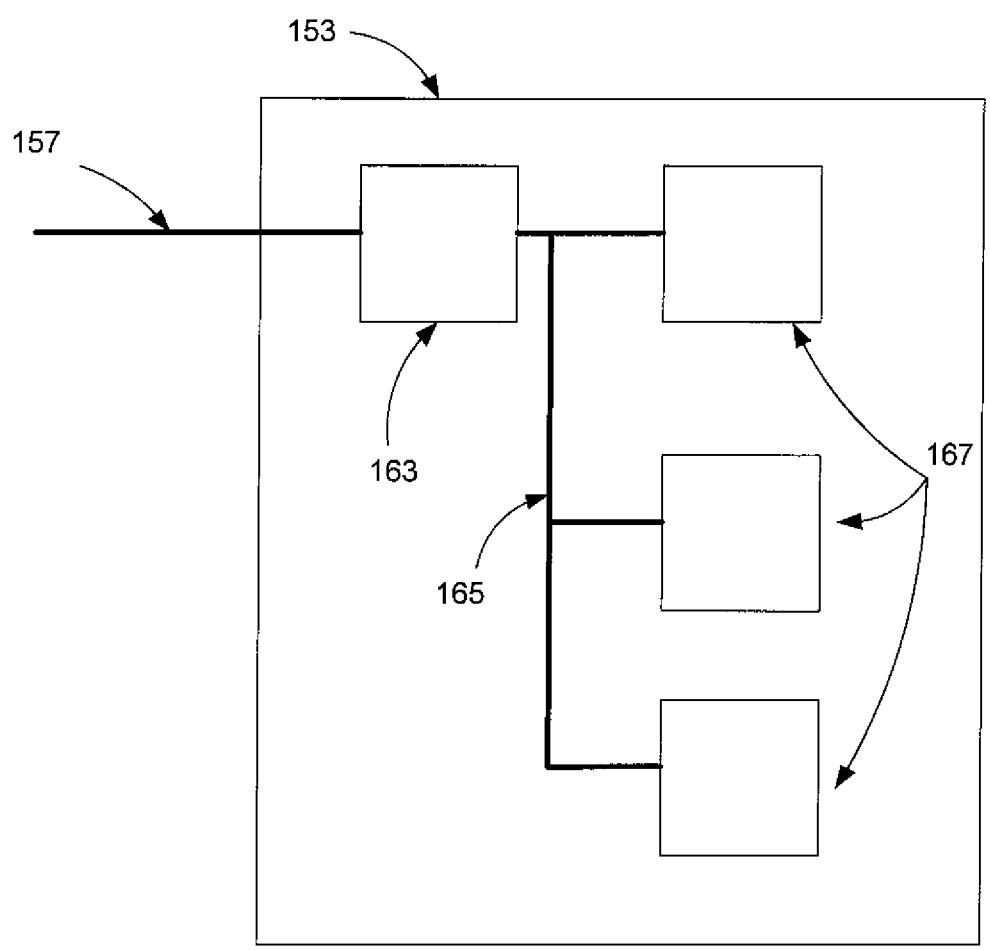
FIG. 13b is a schematic diagram of an exemplary articulation subsystem.

FIGS. 13a and 13b show illustrative embodiments of articulation subsystem 153. Referring to FIG. 13a, articulation subsystem 153 includes an articulation processor 163 electrically coupled to articulation mechanism 167 via interconnect 165. Mechanism 167 is mechanically coupled to a diffractive element (not shown). Articulation processor 163 receives pointing instructions from computation subsystem 151 (FIG. 11) via interconnect 157 to effect articulation of articulation mechanism 167 and the corresponding diffractive element. In an alternative embodiment shown in FIG. 13b, articulation processor 163 is electrically coupled to a plurality of articulation mechanisms 167 via a plurality of interconnects 165. Interconnects 165 may be distinct interconnects or be combined in one or more bus topologies.

Figure 14A:
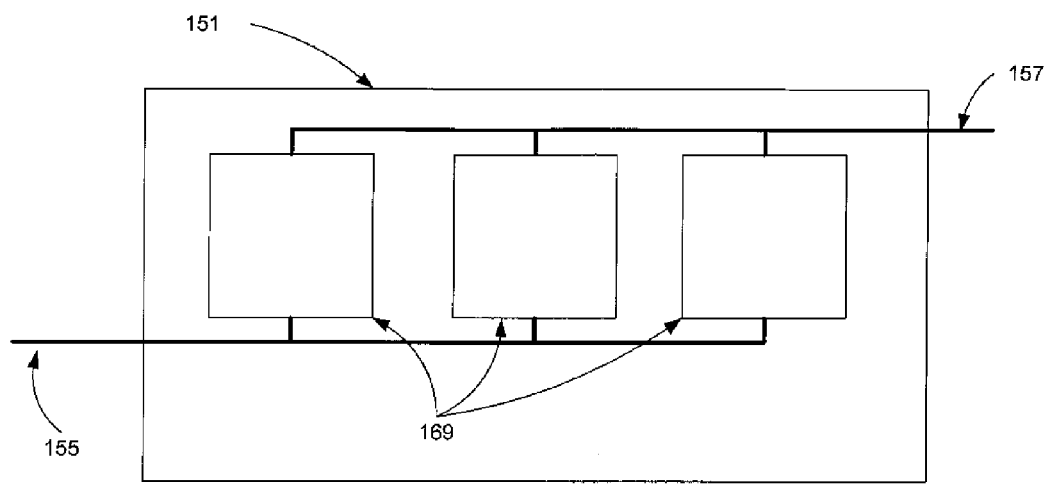
FIG. 14A-B is a schematic diagram of an exemplary computation subsystem.
Figure 14B:
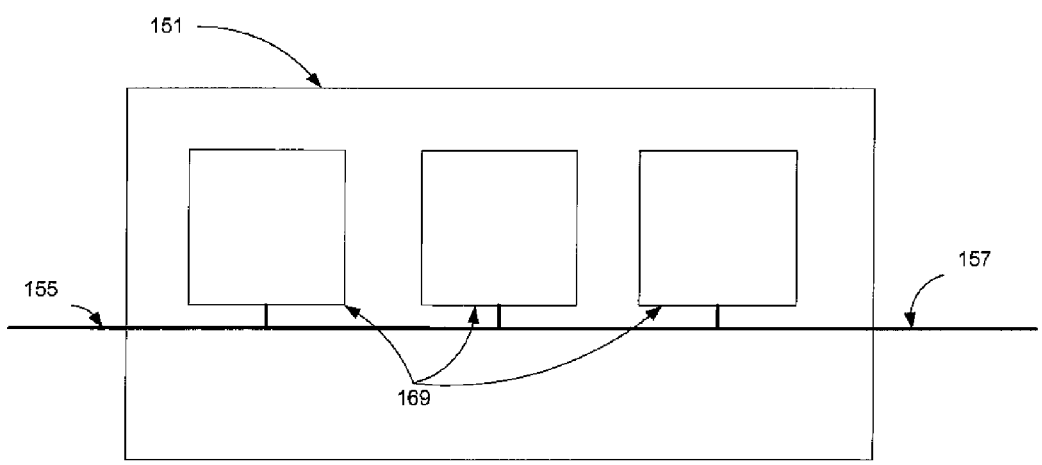

FIG. 14a shows an embodiment of computation system 151 (FIG. 11) in more detail. Computation subsystem 151 includes a plurality of parallel processors 169. Parallel processors 169 are electrically coupled to imaging subsystem 11 via interconnect 155 and to a plurality of articulation subsystems 155 via interconnect 157. In some embodiments parallel processors 169 are coupled so that the interconnect 155 and interconnect 157 are distinct logical and/or physical buses. In alternative embodiments such as shown in FIG. 14b, interconnect 155 and 157 are combined into a single logical and/or physical bus.

Figure 15:
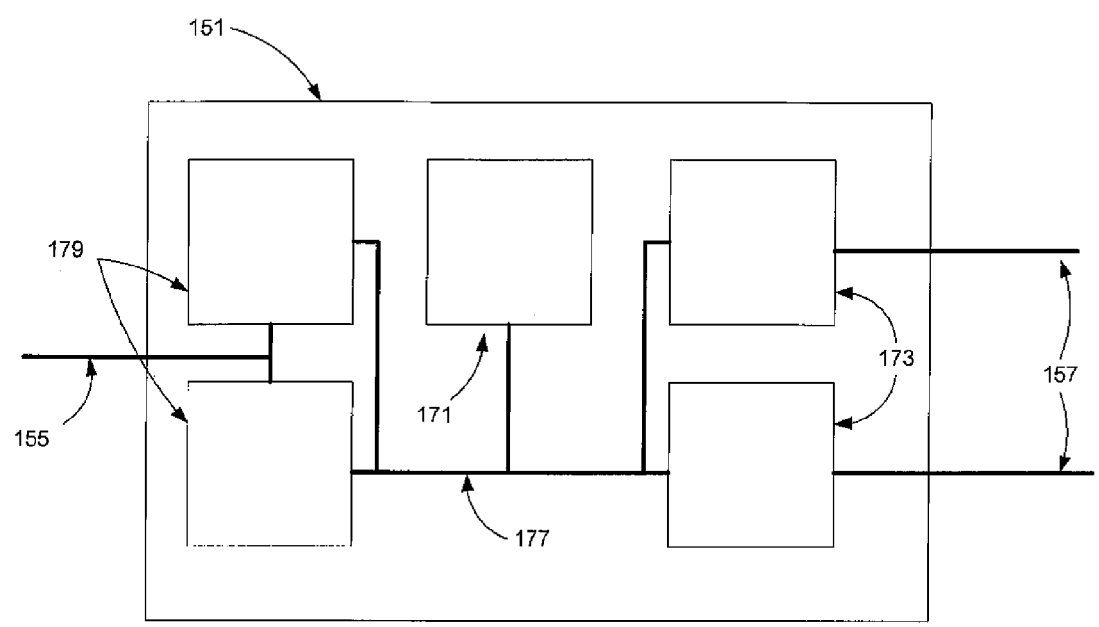
FIG. 15 is a schematic diagram of an alternate exemplary computation subsystem.

FIG. 15 shows an alternative embodiment of computation system 151 (FIG. 11) in more detail. Computation subsystem 151 includes a master processor 171 and a plurality of slave processors 173 and 179 electrically coupled via interconnect 177. Master processor 171 provides supervisory control over the plurality of slave processors 173 and 179, including but not limited to timing and external diagnostic interfacing. Slave processors 179 provide image acquisition and processing via interconnect 155, whereas slave processors 173 provide articulation control via interconnects 157.

Figure 16A:
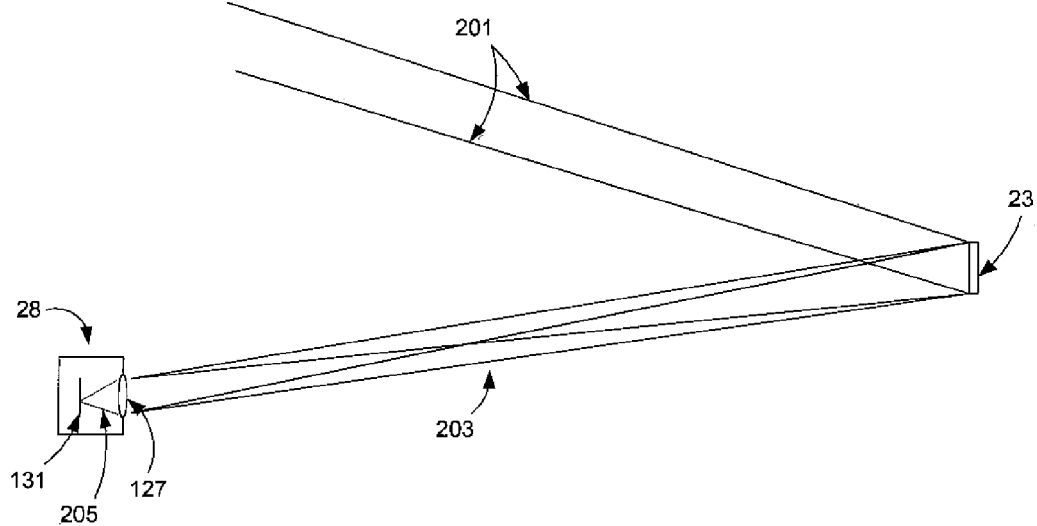
FIG. 16A-C is an exemplary 2D ray trace of a diffractive element.
Figure 16B:
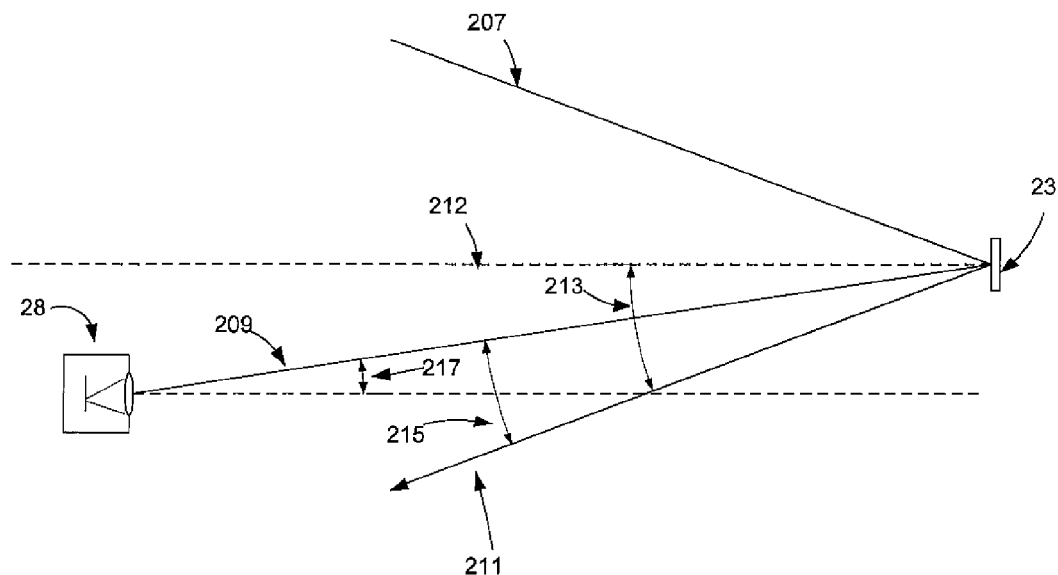
Figure 16C:
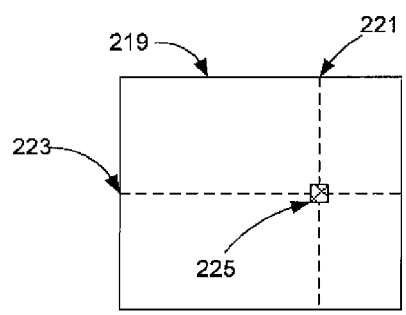

The optical properties of diffractive elements according to the present invention advantageously provide a method whereby imaging subsystem 11 (FIG. 11) in conjunction with a computation subsystem 151 (FIG. 11) is able to use observed diffraction information to sense and determine the angular displacement of the $0^{th}$ order reflected beam relative to the observation point. FIGS. 16a through 16c illustrate this schematically with respect to CSP system 1 of FIGS. 2a-2c and 3. Referring to FIG. 16a, diffractive element 23 is illuminated by a distant polychromatic source such that the incident rays 201 that hit diffractive element 23 are substantially parallel. Imaging device 28 receives light scattered, reflected, or diffracted by diffractive element 23 through its lens aperture 127. The collected ray bundles represented by the edge rays 203 are focused by the imaging device onto a focal plane array 131. The focused ray bundle is represented by edge rays 205. As shown in FIG. 16c, the resulting image 219 contains the sub image 225 of the diffractive element 23. In the case where imaging device 28 is substantially far away from diffractive element 23 relative to the size of the diffractive element 23, the angular extent of collected rays 203 is relatively small. Under these conditions we approximate the optics using just the central rays. Exemplary image 219 acquired by imaging device 28 has sub-image 225 that is the mapping of the diffractive element 23 into image space. The location of diffractive element 23 in image space represented by sub-image 225 is given by horizontal coordinate 221 and vertical coordinate 223.

FIG. 16b shows how diffraction information can be used to help determine the location vector of redirected light. In FIG. 16b, source ray 207 impinges on diffractive element 23. The reflected ray 211 makes angle 213 relative to the diffractive element normal 212. The central, collected ray 209 observed by imaging device 28 makes an angle 215 relative to the reflected ray 211. Angle 217 represents the nominal angular position of diffractive element 23 in imaging device's 27 field of view. Due to the optical effects of diffractive element 23; the color of sub-image 225 (FIG. 16b) is a function of angle 215. In the case that angle 215 lies within one of the non-zero diffractive orders of diffractive element 23, sub-image 225 will be substantially monochromatic. In the case that angle 215 is 0° (coincident with the reflected beam) sub-image 225 will be the image of the source and will be substantially the color of the source. In the case that angle 215 is between the $0^{th}$ and $\pm 1^{st}$ diffractive orders of visible light sub-image 225 will be a diffuse image of diffractive element 23 as generally there will be some level of Lambertian scattering.

Figure 17:
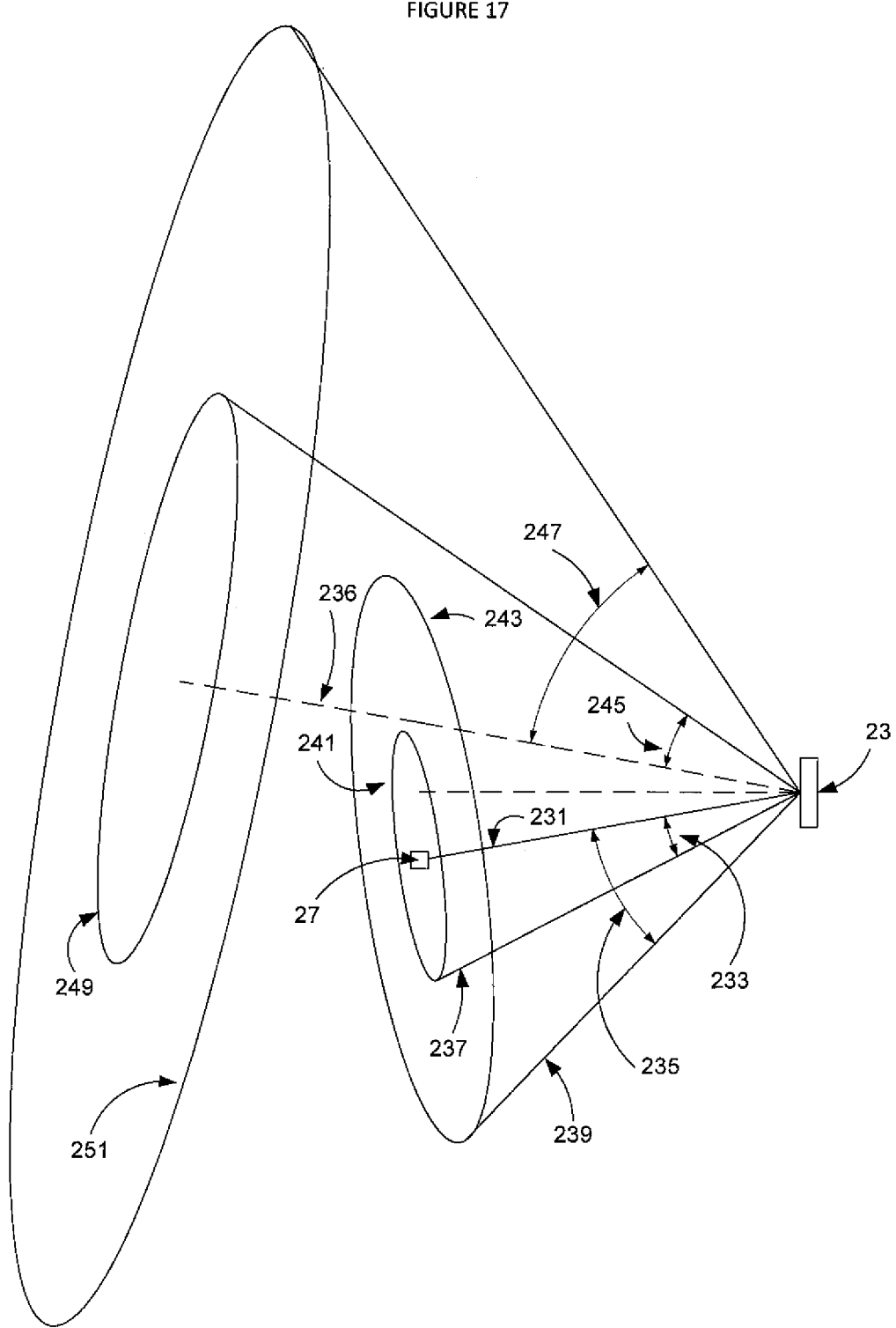
FIG. 17 is an exemplary perspective ray trace of a diffractive element.

Of particular interest is the case in which angle 215 lies within the visible portion of a non-zero diffractive order. Under this condition the color of sub-image 225 provides information about the possible magnitude of angle 215. FIG. 17 schematically shows this in more detail. Referring to FIG. 17, imaging device 28 observes diffractive element 23 illuminated by a substantially collimated white light source (not shown) from a distance substantially far away such that sub image 225 (FIG. 16c) is substantially monochromatic and may be characterized by a central wavelength λ. Given the specific diffractive properties of the diffractive element 23 and the observed wavelength λ, the angle between the line of sight 231 between element 23 and imaging device 28 (the camera-element line of sight) and the $0^{th}$ order reflected ray, $\theta_m$, is constrained to be a member of the set of angles corresponding to this wavelength; one angle for each possible diffractive order. Two such possible angles $\theta_{-1}$ 233 and $\theta_{-2}$ 235 are shown and correspond to the $-1^{st}$ and $-2^{nd}$ order rays for exemplary reflected rays 237 and 239 respectively. Note that these angles and orders are exemplary and do not represent the full set of possible angles for a given observed wavelength λ.

Furthermore for each possible angle solution for the observed wavelength λ, there are in fact an infinite number of possible reflected ray vectors that lie along the surface of a cone with vertex angle $2\theta_m$. The set of cones share a common axis coincident with the line of sight vector 231. The cones are represented by their circular bases 241 and 243 for the angles 233 and 235, respectively. Given the set of possible reflection vectors for the observed wavelength, using the laws of reflection the set of possible incident light vectors also can be determined. The set of all possible incident light vectors lie along the set of cones having a common axis 236, which is the reflection (off diffractive element 23) of the line of sight 231 of imaging device 28, and having vertex angles 245 and 247. These cones are represented by their circular bases 249 and 251 in the exemplary solution. By the laws of reflection, angle 245 equals angle 233, and angle 247 equals angle 235. Thus, the observed diffraction information allows candidate vector locations of reflected light to be propagated backwards to determine candidate incident light vectors. The set of candidate solutions generally form cones with an apex at the diffractive element 23, main axes 236 which is the reflection of imaging device line of sight 231, and cone apex angles that can be determined from the observed diffraction information.

Whereas the image of a diffractive element 23 from a single viewpoint such as provided by a single imaging device can provide some information about the orientation of the reflected ray, multiple viewpoints provide more specific information. This allows the reflected and incident light vectors to be precisely identified from the diffraction information. The loci of candidate solutions can be narrowed to a single solution very accurately.

Figure 18:
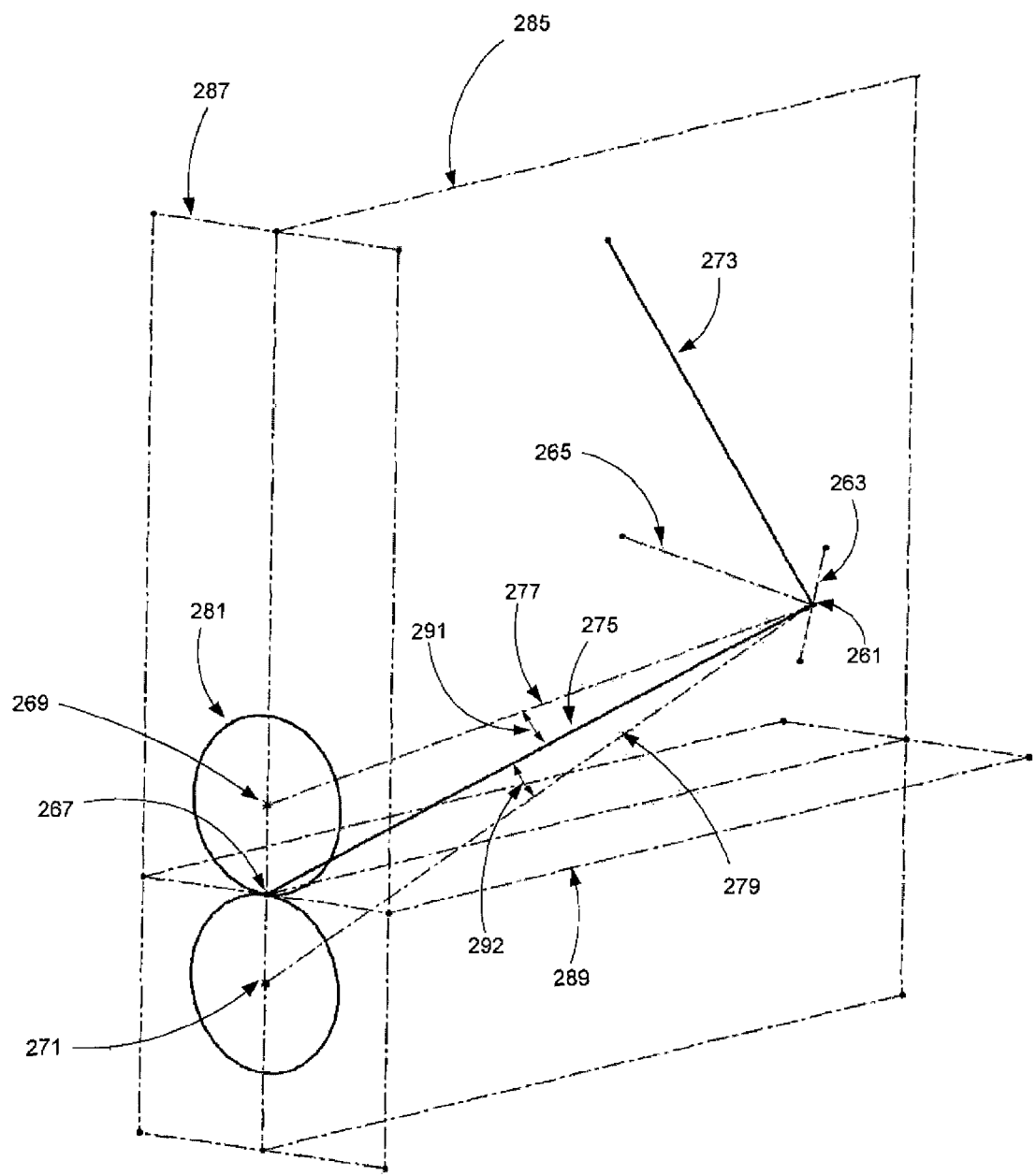
FIG. 18 is an exemplary perspective ray trace of a diffractive element from two viewpoints.

For example, a two viewpoint embodiment provides sufficient information by which to constrain reflected ray orientation to at most two possible vectors and in some limited cases, can uniquely constrain the reflected ray orientation. FIG. 18 shows this schematically. Referring to FIG. 18, a diffractive element is represented as point 261 having a normal vector 265 lying in plane 285 and passing through the intersection of planes 285 and 287. Imaging devices having viewpoints represented by points 269 and 271 lie on plane 285 at the intersection with plane 287. Light ray 273 is incident on point 261 representing the diffractive element and is in plane 285. Reflected and diffracted ray 275 also is in plane 285 and passes through plane 287 at point 267. At the outset, the location of ray 275 is unknown, but the location can be determined from diffraction information according to principles of the present invention. Lines of sight 277 and 279 form angles 291 and 292 with the reflected ray 279 respectively resulting in observed diffraction information, e.g., an observed color, per viewpoint of diffractive element 261. Circles 281 and 283 represent the locus of possible reflected rays that would result in the color observed at viewpoints 267 and 271 respectively. The intersection of 281 and 283 is a single point 267 which is in fact the unique solution to the two viewpoint observation. Thus, the vector corresponding to ray 275 is precisely determined using two viewpoints in this illustration.

Figure 19:
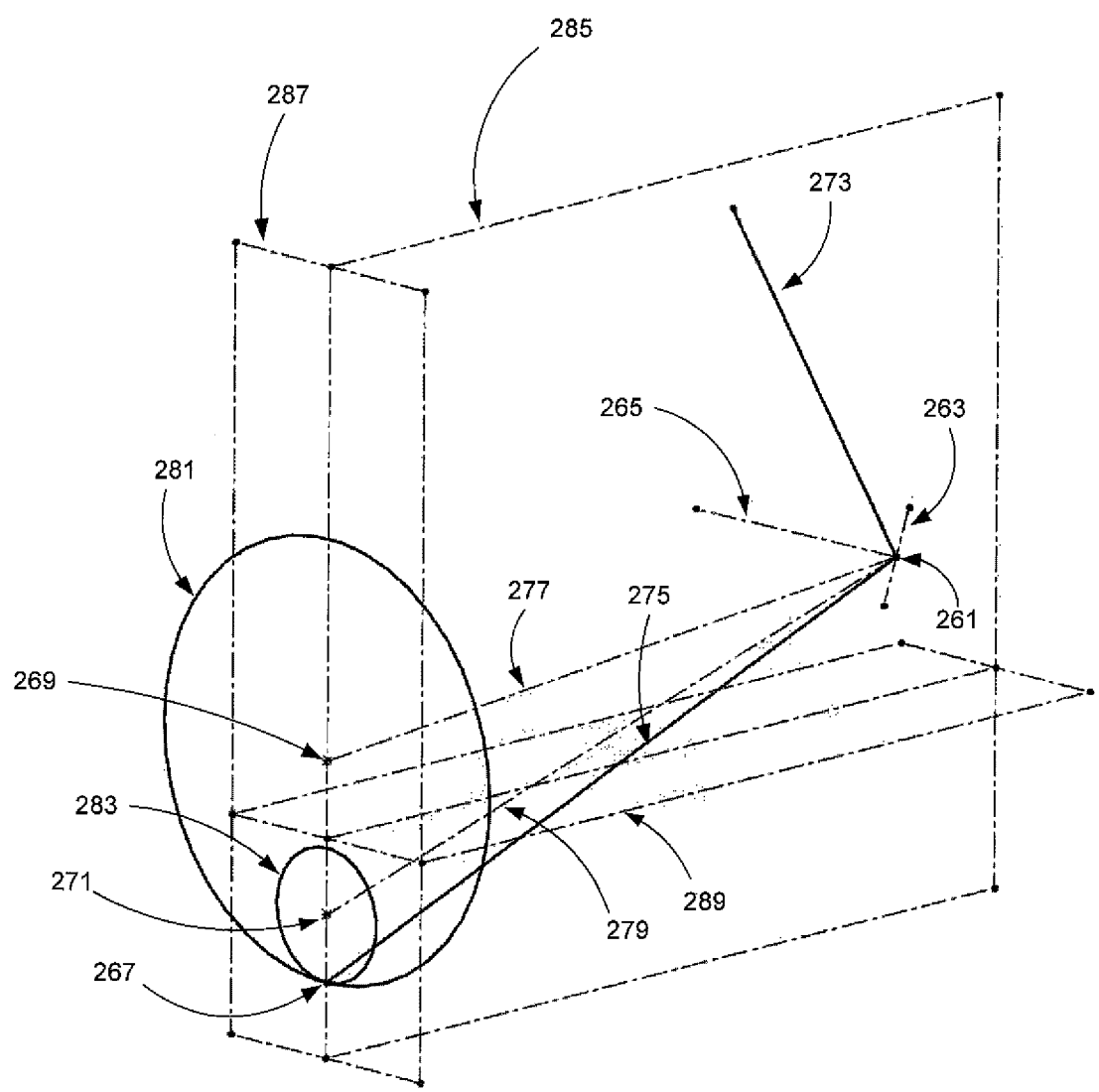
FIG. 19 is an exemplary perspective ray trace of a diffractive element from two viewpoints.

FIG. 19 shows another instance in which two viewpoints provide a single solution. Referring to FIG. 19 a similar two viewpoint constraint is demonstrated in which incident ray 273 reflects and diffracts from diffractive element 261 such that reflected and diffracted ray 275 is in plane 285 and intersects plane 287 at point 267. In this example the location of intersection 267 is such that it is not located between viewpoints 269 and 271, although at the outset the location of point 267 is unknown but can be determined using principles of the present invention. In this instance the locus of constant color rays represented by circle 283 for viewpoint 271 is encircled by locus of constant color rays 281 for viewpoint 269. The two loci have a single intersection point 267. This is the unique solution for reflected ray 275 provided by the observed diffraction information from locations 269 and 271. In fact, it can be shown that for any reflected ray 275 lying along plane 285, the loci of constant color points from viewpoints 269 and 271 have a single intersection 267. This allows the location of reflected ray 275 to be precisely determined.

In many cases, however, the plane of incidence and reflection is not coplanar with plane 285 (which is the line of sight plane between diffractive element and the observation point), and a unique locus intersection does not exist using only two viewpoints. Using principles of the present invention, however, observing diffraction information from more than two viewpoints provides a unique solution in this circumstance. Three viewpoints is sufficient. Four viewpoints allows a unique solution with very high precision and extra information for redundancy. More than four can be used, but may not be needed. This is shown in FIG. 20.

Figure 20:
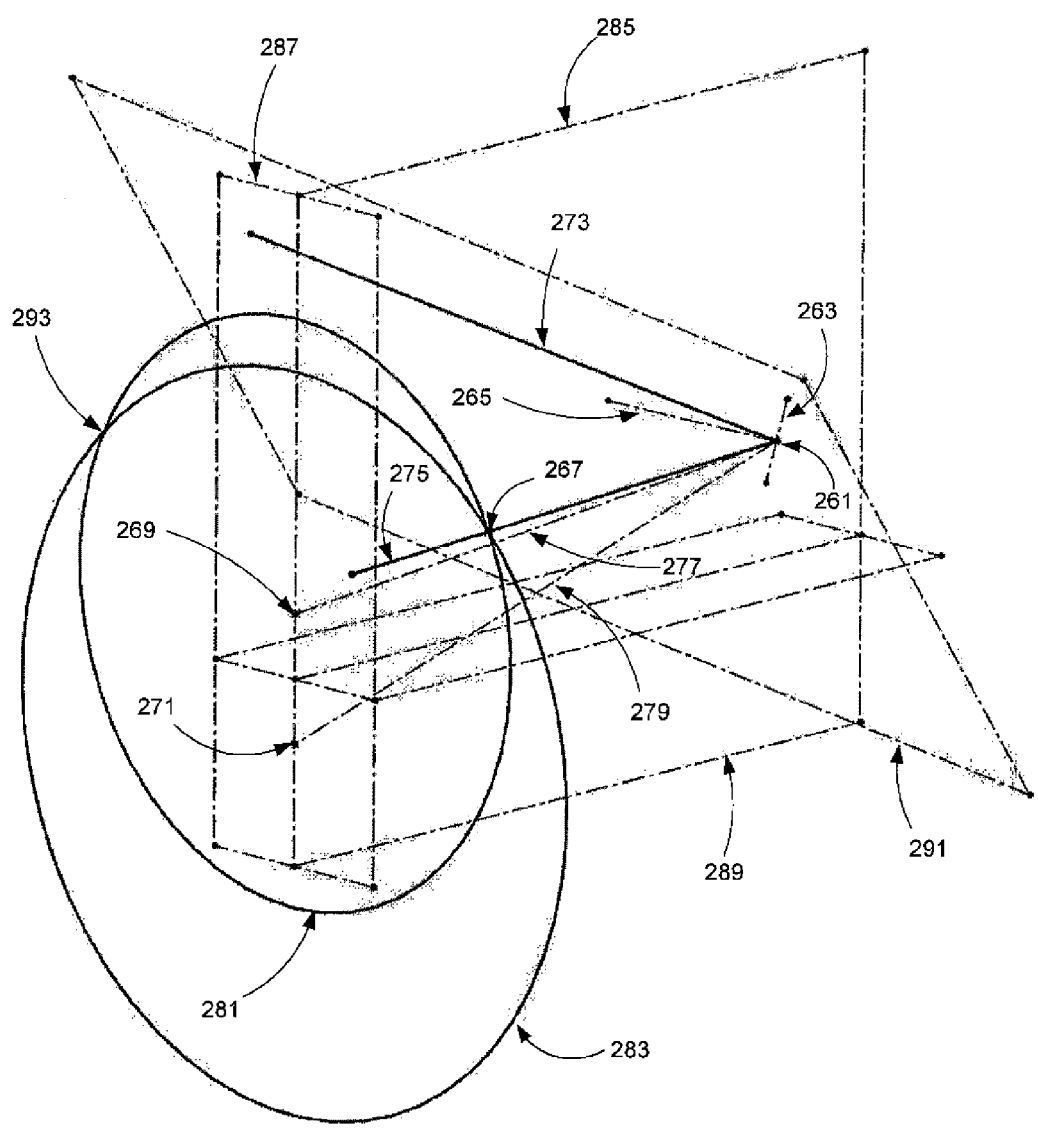
FIG. 20 is an exemplary perspective ray trace of a diffractive element from two viewpoints.

Referring to FIG. 20, incident ray 273 and reflected ray 275 lie in plane 291 that is not coplanar with plane 285. Resulting constant color loci 281 and 283 for viewpoints 269 and 271 respectively intersect at point 267 which lies along reflected ray 275. In addition, loci 281 and 283 have a secondary intersection at point 293. This intersection represents an alternative reflected ray that would result in the same set of observed colors from the two viewpoints 269 and 271. At the outset, it would not be known which solution is correct in many situations. Consequently, observation of diffractive element 261 from two viewpoints alone does not provide unique determination of the reflected ray vector 275. In some possible embodiments, existence of certain constraints may provide sufficient knowledge to overcome the aforementioned ambiguity associated with the two viewpoint observation. One such constraint includes constraints on the location of the light source. In particular, in the case of a concentrating solar power system, it is possible that one of the two possible solutions 267 and 293 is not feasible because it would imply a sun position that is below the horizon. In alternate applications various other constraint(s) may be used to resolve which of the two possible solutions is correct.

Another approach to resolve the possible ambiguity with the two viewpoint observation is a step and observe method. This method uses multiple observations as a function of orientation of diffractive element 261 to determine which of the two solutions 267 or 293 describes the real reflected ray 275. In effect, this adds additional viewpoints, allowing the solution to be solved.

Figure 21:
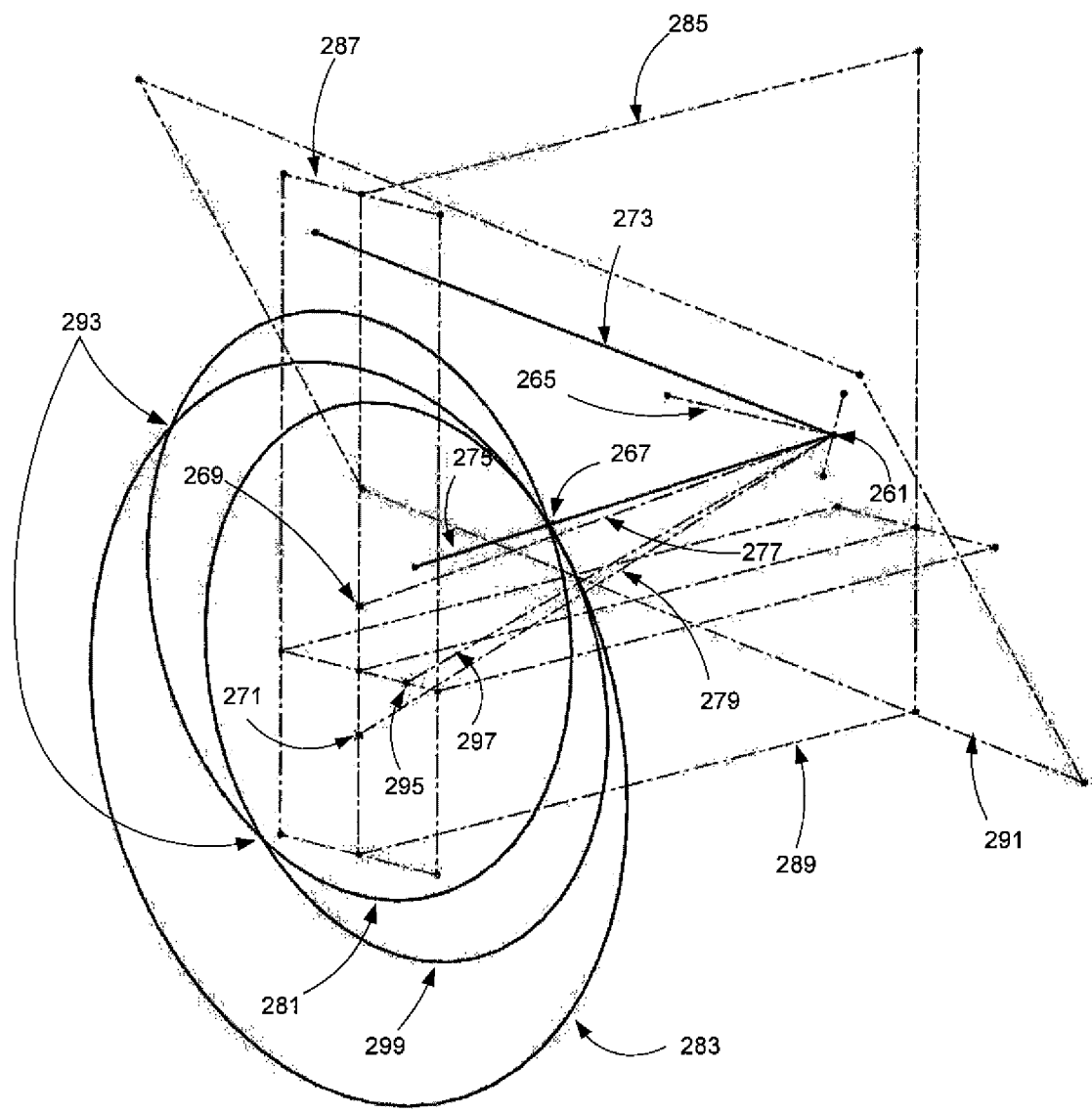
FIG. 21 is an exemplary perspective ray trace of a diffractive element from three viewpoints.

Yet another approach to overcome ambiguity present in the two viewpoint observation is the addition of at least a third viewpoint. This is shown in FIG. 21. Referring to FIG. 21, third viewpoint 295 having line of sight 297 to point 261 is added. Viewpoint 295 lies in plane 287 to observe diffraction information such as color that is a function of the angle formed between line of sight 297 and reflected ray 275. The locus of constant color for viewpoint 295 is represented by circle 299. Points 293 represent the set of intersections between exactly two loci circles 283/281 and 283/299. In contrast, point 267 represents the unique intersection of all three loci circles 281, 283, and 299. Consequently, color observation from three distinct viewpoints 269, 271, and 295 provides unique determination of the vector corresponding to reflected ray 275.

Thus, three distinct viewpoints are sufficient to uniquely determine the orientation of reflected ray vectors originating from a known point (e.g., point 261 in FIGS. 18-20) in space. In general four or more distinct viewpoints may be used. In such embodiments, viewpoints in excess of three may provide redundancy function, which may be helpful, for instance, in case a particular viewpoint is obstructed.

The diffraction information used for illustrative purposes in FIGS. 18-20 is color. A variety of different kinds of diffraction information can be used singly or in combination in control systems of the present invention. For example, in addition or as an alternative to observed color of diffractive element 261 from a plurality of viewpoints, the relative intensity of the observed light also provides information that may be used to determine the orientation of a reflected ray. In particular, relative intensity is useful for determining whether two or more viewpoint observation correspond to the same or different diffraction orders.

FIGS. 20-21 and the corresponding discussion show how three or more distinct viewpoints provide a unique characterization of the orientation of a ray 275 reflected from a viewpoint 261. The relationship can be represented by equation 2:

$$C_i = A_i \cdot R_i \quad (2)$$

Where $C_i$ is a vector having an element corresponding to the color observed from the $i^{th}$ diffractive element 23, $R_i$ is a unit vector corresponding to the orientation of reflected and diffracted ray 275 for the $i^{th}$ diffractive element 261 relative to a known reference coordinates space, and $A_i$ is a transformation matrix that maps reflected ray unit vector into the color vector for the $i^{th}$ diffractive element 261. Given color observation from three or more viewpoints and transformation $A_i$, it is possible to determine the orientation of the reflected ray by using the inverse of equation 2:

$$R_i = A_i^{-1} \cdot C_i \quad (3)$$

Furthermore, referring to FIG. 22, in a typical mode of practice such as with respect to CSP system 1 of FIGS. 2A-2C and 3, it is desirable that light redirecting elements 25 be oriented in such a manner such that reflected rays 305 from each light redirecting element 25 resulting from incident rays 303 substantially intersect a known point in space referred to herein as the nominal target 301 of the light redirecting elements 25 when these are aimed as desired to concentrate sunlight. In FIGS. 2A-2C, this corresponds to the focus area 7. Consequently, for each light redirecting element 25, there is a vector that describes the desired orientation of the reflected ray 305 from a light redirecting element 25 to the nominal track point 301. FIG. 22 shows a single nominal track point 301 for the entire plurality of light redirecting elements 25, and this nominal track point 301 preferably is substantially fixed in position relative to the control system Referring to FIG. 23, in an alternative embodiment, there may be a plurality of nominal track points 301. In such alternative embodiments each nominal track point 301 may be associated with a subset of the plurality of light redirecting elements 25.

Referring to FIG. 24, in another alternative embodiment, the nominal track point 301 is substantially fixed for a period of time and then moved to another location 309 for another period of time. After the track point is shifted to location 309, new aiming vectors 307 result. The number of fixed locations and the duration of respective periods are not constrained. In yet another alternative embodiment the location of the nominal track point is a substantially continuous function of time.

In illustrative modes of practice, at a given instant in time there is a substantially fixed nominal track point associated with a single light redirecting element from which a desired reflected ray vector $r_{i,0}$ can be determined such that reflected rays generally intersect the desired nominal track point. Consequently, according to equation 2 there is a color observation vector $c_{i,0}$ that represents this desired reflected ray vector. Given a color observation $c_{i,j}$ that corresponds to the multi-viewpoint observation of the $i^{th}$ diffractive element at a known orientation represented by a unit normal vector $n_{i,j}$. The value of the unit normal is a function of the orientation of the articulation mechanism associated with the diffractive element. Mathematically, the unit normal of a diffractive element can be described by the following vector equation:

$$N_i = B \cdot X_i \quad (4)$$

Where $N_i$ is the unit normal of the $i^{th}$ diffractive element, $X_i$ is a vector describing the quantities of each degree of freedom of articulation mechanism, and B is the transformation matrix that maps articulation coordinates into the diffractive element unit normal.

An exemplary method of performing closed loop tracking of a plurality of articulating diffractive elements in order that the reflected rays substantially intersect a known location includes the following steps, desirably implemented for every diffractive element and light redirecting element within the scope of the control system. Procedure 1 is as follows:
1. Sample the color vector $C_i$ including as vector elements the observed color from a plurality of distinct viewpoints.
2. Compute the difference between the observed color vector $C_i$ and the nominal on target color vector $C_{iO}$ herein referred to as $\Delta C_i$.
3. Compute articulation compensation vector $\Delta X_i$ such that $$\lim_{\Delta C_i \to D} \Delta X_i = 0$$

4. Apply $\Delta X_i$ to articulation mechanism.
5. Repeat steps 1-4

An alternative method of performing closed loop tracking of a plurality of articulating diffractive elements in order that the reflected rays substantially intersect a known location includes the following steps for every diffractive element according to Procedure 2:
1. Compute open loop articulation coordinate $X_i$ based on geospatial coordinates, local date and time, and position relative to the target position.
2. Apply open loop articulation coordinate Xi to articulation mechanism
3. Sample the color vector $C_i$ including as vector elements the observed color from a plurality of distinct viewpoints.
4. Compute the difference between the observed color vector $C_i$ and the nominal on target color vector $C_{iO}$ herein referred to as $\Delta C_i$.
5. Compute articulation compensation vector $\Delta X_i$ such that $$\lim_{\Delta C_i \to D} \Delta X_i = 0$$

6. Apply $\Delta X_i$ to articulation mechanism.
7. Repeat steps 1-6

Yet another alternative method includes the following steps according to Procedure 3:
1. Generating a lookup table of articulation coordinates $X_i[t]$ where t is the local time of day such that $X_i[t]$ is the last known substantially on target articulation coordinate at time t.
2. Interpolate $X_i$ coordinate for the current time based on lookup table.
3. Apply interpolated $X_i$ coordinate for the current time based on lookup table.
4. Sample the color vector $C_i$ including as vector elements the observed color from a plurality of distinct viewpoints.
5. Compute the difference between the observed color vector $C_i$ and the nominal on target color vector $C_{iO}$ herein referred to as $\Delta C_i$.
6. Compute articulation compensation vector $\Delta X_i$ such that $$\lim_{\Delta C_i \to D} \Delta X_i = 0$$

7. Apply $\Delta X_i$ to articulation mechanism.
8. Repeat steps 2-6

In illustrative modes of practice, any of Procedures 1 to 3 is used in a CSP system in which a plurality of heliostats concentrate sunlight onto one or more targets. The heliostats include light redirecting elements that allow sunlight to be redirected. The light redirecting elements are mechanically coupled to articulation mechanisms allowing controlled articulation of the light redirecting elements. Corresponding diffractive elements are coupled to the light redirecting elements so that diffraction information produced by the diffractive elements is indicative of how the light redirecting elements are aimed. The system includes an imaging subsystem comprising one or more imaging devices in a position effective to observe diffraction information produced by the diffractive elements that is indicative of the aim of the corresponding light redirecting elements. Preferably, the imaging devices are mechanically coupled to a support structure and are arranged proximal to the one or more targets. A computational subsystem including one or more computational devices is operationally coupled to the imaging devices so that the diffraction information captured by the imaging devices can be used to controllably aim the light redirecting elements at the desired target(s).

The complete disclosures of the patents, patent documents, technical articles, and other publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:
1. A method of redirecting sunlight onto a target, comprising the steps of:
   a) providing a light redirecting element that comprises at least one diffractive element coupled to the light redirecting element in a manner such that a color characteristic of light diffracted by the diffractive element correlates to the aim of the light redirecting element;
   b) using the light redirecting element to redirect and aim the sunlight at a target and using the diffractive element to diffract a portion of the sunlight;
   c) observing a color characteristic of the diffracted portion of the sunlight; and
   d) using the observed color characteristic of the diffracted sunlight in a closed loop control system to controllably actuate the light redirecting element in a manner that aims the redirected sunlight onto the target.
2. The method of claim 1, wherein step (b) comprises using a plurality of heliostats, wherein each heliostat comprises a light redirecting element and at least one diffractive element coupled to the light redirecting element in a manner such that a color characteristic of light diffracted by the diffractive element coupled to a corresponding light redirecting element correlates to the aim of the corresponding light redirecting element; wherein step (b) comprises using the light redirecting elements to redirect sunlight and using the diffractive elements to diffract a portion of the sunlight; wherein step (c) comprises observing color characteristics of the diffracted sunlight; and step (d) comprises using the observed color characteristics to aim the heliostats to concentrate redirected sunlight onto the target.

3. The method of claim 2, wherein each diffractive element is coupled to a corresponding light redirecting element in a manner such that diffraction information produced by the diffractive element is indicative of the aim of the corresponding light redirecting element.

4. The method of claim 1, wherein the light redirecting element has a reflecting surface and the diffractive element is coupled to the reflecting surface.

5. The method of claim 1, wherein the diffractive element comprises a plurality of diffractive sub-elements.

6. The method of claim 1, wherein the diffractive element comprises a plurality of diffractive sub-elements having a respective plurality of diffractive characteristics such that the sub-elements produce different diffraction information.

7. The method of claim 1, wherein the diffractive element comprises a plurality of diffractive sub-elements comprising a plurality of linear diffraction gratings.

8. The method of claim 1, wherein the diffractive element comprises a circular diffraction feature.

9. The method of claim 1, wherein the diffractive element comprises a plurality of sub-elements, each sub-element comprising a plurality of circular diffraction features.

10. The method of claim 1, wherein the diffractive element comprises a spiral diffraction feature.

11. The method of claim 1, wherein the diffractive element comprises a plurality of sub-elements, each sub-element comprising a spiral diffraction feature.

12. The method of claim 1, wherein an imaging device is positioned proximal to the target, said imaging device having a field of view that includes the diffracted light, and wherein step (b) comprises using the imaging device to observe a color characteristic of the observed diffracted light.

13. The method of claim 12, wherein the imaging device has a field of view that includes a plurality of heliostats and wherein step (b) comprises using the imaging device to observe light diffracted by a plurality of diffractive elements on a plurality of light redirecting elements in a way such that color characteristics of the observed diffracted light are used to controllably articulate the corresponding light redirecting elements so that the light redirecting elements redirect and concentrate sunlight onto the target.

14. The method of claim 1, wherein the target is on a tower and a structure is mounted to the tower, and a plurality of imaging devices are mounted to the structure, and wherein step (b) comprises using the imaging devices to observe light diffracted by a plurality of diffractive elements on a plurality of light redirecting elements in a way such that color characteristics of the observed diffracted light are used to controllably articulate the corresponding light redirecting elements so that the light redirecting elements redirect and concentrate sunlight onto the target.

15. The method of claim 1, wherein step (b) comprises using at least three perspectives of diffraction information to controllably actuate a light redirecting element.

16. A system for concentrating sunlight onto a centralized target, comprising:
   a) a plurality of heliostats, each heliostat comprising:
      i. a light redirecting element that redirects incident sunlight;
      ii. a diffractive element that is coupled to the light redirecting element and that diffracts incident sunlight, wherein a color characteristic of the diffracted sunlight is indicative of the aim of sunlight redirected by the light redirecting element;
   b) a device that observes the color characteristic of the diffractive light; and
   c) a control system that uses the observed color characteristic of the diffracted light to determine a compensation that articulates the redirecting elements to concentrate the redirected sunlight onto the centralized target.

17. A heliostat system for concentrating sunlight onto a centralized target, comprising:
   a) a plurality of heliostats that redirect and concentrate sunlight onto the centralized target; each heliostat comprising:
      i. a light redirecting element that redirects incident light onto the centralized target; and
      ii. at least one diffractive element provided on the redirecting element and that diffracts incident sunlight, wherein a color characteristic of the diffracted sunlight is indicative of the aim of the sunlight redirected by the light redirecting element;
   b) an imaging device comprising a field of view that observes the diffracted sunlight and
   c) a control system that uses a color characteristic of the observed diffracted sunlight to determine a compensation that articulates the light redirecting elements to concentrate the redirected sunlight onto the centralized target.

* * * * *